United States Patent
Im et al.

(10) Patent No.: US 9,851,091 B2
(45) Date of Patent: Dec. 26, 2017

(54) HEAD MOUNTED DISPLAY

(71) Applicant: LG ELECTRONICS INC., Seoul (KR)

(72) Inventors: Soungmin Im, Seoul (KR); Sungjin Kim, Seoul (KR); Sungmin Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 14/829,531

(22) Filed: Aug. 18, 2015

(65) Prior Publication Data

US 2016/0238236 A1 Aug. 18, 2016

Related U.S. Application Data

(60) Provisional application No. 62/117,783, filed on Feb. 18, 2015.

(30) Foreign Application Priority Data

Apr. 28, 2015 (KR) .................. 10-2015-0059958

(51) Int. Cl.
*G02B 27/01* (2006.01)
*F21V 33/00* (2006.01)
(Continued)

(52) U.S. Cl.
CPC ........ *F21V 33/0052* (2013.01); *F21V 19/001* (2013.01); *G01S 5/163* (2013.01);
(Continued)

(58) Field of Classification Search
CPC .... F21V 33/0052; F21V 19/001; G01S 5/163; G02B 27/017; G02B 2027/0187; F21Y 2105/003
See application file for complete search history.

(56) References Cited

U.S. PATENT DOCUMENTS 5,227,985 A 7/1993 DeMenthon
6,734,838 B1 * 5/2004 Eichenlaub ............ G02B 3/005
345/8
(Continued)

FOREIGN PATENT DOCUMENTS

JP 2000347128 12/2000
JP 2014093703 5/2014
(Continued)

OTHER PUBLICATIONS

Korean Intellectual Property Office Application No. 10-2015-0059958, Notice of Allowance dated Aug. 30, 2016, 1 page.
(Continued)

*Primary Examiner* — Elmito Breval
*Assistant Examiner* — Fatima Farokhrooz
(74) *Attorney, Agent, or Firm* — Lee, Hong, Degerman, Kang & Waimey

(57) ABSTRACT

Disclosed is a head mounted display (HMD) having light emitting devices. The HMD includes a body having a plurality of surfaces; and a plurality of light emitting units formed on the plurality of surfaces and configured to emit light to outside of the body, wherein each of the plurality of light emitting units includes at least four light emitting devices that are disposed in a straight line in a spaced manner such that a specific cross ratio defines spacing for each of the plurality of light emitting units, a cross ratio of one of the plurality of light emitting units being different from cross ratios of other light emitting units among the plurality of light emitting units.

20 Claims, 11 Drawing Sheets

(51) Int. Cl.
   *F21V 19/00*   (2006.01)
   *G01S 5/16*    (2006.01)
   *F21Y 105/00*  (2016.01)
   *F21Y 105/10*  (2016.01)

(52) U.S. Cl.
   CPC ...... *G02B 27/017* (2013.01); *F21Y 2105/003* (2013.01); *F21Y 2105/10* (2016.08); *G02B 2027/0187* (2013.01)

(56) References Cited

U.S. PATENT DOCUMENTS

| | | |
|---|---|---|
| 2006/0011805 A1 | 1/2006 | Spruck |
| 2008/0018641 A1* | 1/2008 | Sprague ............... G02B 27/017 |
| | | 345/419 |
| 2009/0122030 A1* | 5/2009 | Morimoto ............. G06F 3/0321 |
| | | 345/179 |
| 2012/0293395 A1* | 11/2012 | Williams ............. G02B 27/017 |
| | | 345/8 |
| 2014/0286644 A1* | 9/2014 | Oshima .................. H04B 10/11 |
| | | 398/118 |
| 2015/0261291 A1* | 9/2015 | Mikhailov ............. G06F 3/012 |
| | | 345/156 |

FOREIGN PATENT DOCUMENTS

| | | |
|---|---|---|
| KR | 20110082329 | 7/2011 |
| WO | 2011/073682 A1 | 6/2011 |

OTHER PUBLICATIONS

European Search Report issued in European Application No. 15181514.9, Jun. 21, 2016, 9 pages.

\* cited by examiner

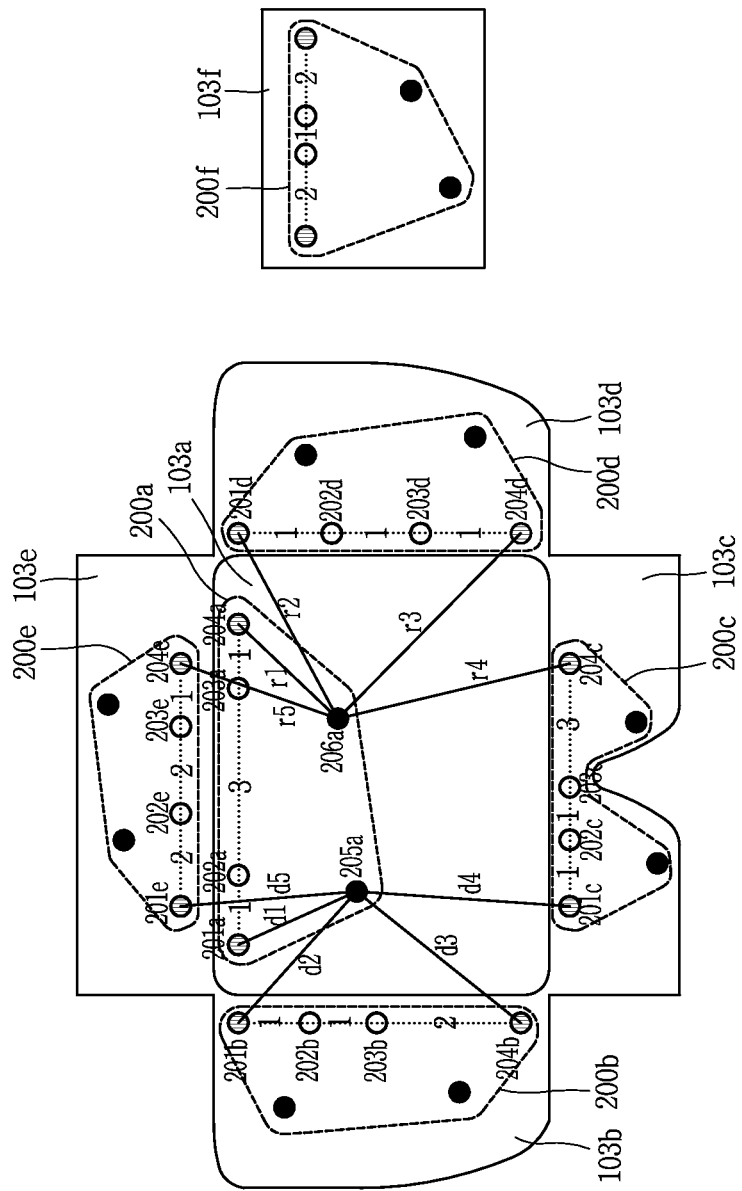

HEAD MOUNTED DISPLAY

CROSS-REFERENCE TO RELATED APPLICATION

Pursuant to 35 U.S.C. §119, this application claims the benefit of U.S. Provisional Application No. 62/117,783, filed on Feb. 18, 2015, and also claims the benefit of earlier filing date and right of priority to Korean Patent Application No. 10-2015-0059958, filed on Apr. 28, 2015, the contents of which are all hereby incorporated by reference herein in their entirety.

BACKGROUND OF THE INVENTION

1. Field of the Invention

The present invention relates to a head mounted display (HMD) and more particularly, to a head mounted display having light emitting devices.

2. Background of the Invention

A head mounted display (HMD) refers various types of image display devices worn on a user's head in the form of eyewear glasses, and configured to allow a user to see images (content) therethrough. As digital devices become lighter and smaller, various wearable computers are being developed and the HMD is being widely used. The HMD may provide a user not only with a display function, but also with various functions by combining an augmented reality (AR) technique, an N screen technique, and the like.

As usage of the HMD is increased nowadays, methods of executing various functions according to a posture of the HMD are actively researched. The posture of the HMD includes a mounted state of the HMD to a user's head, a tilted degree of the HMD, a direction that the HMD faces, a position of the HMD, rotation of the HMD, movement of the HMD, and the like.

In order to determine (estimate, trace, detect, extract, recognize, or identify) the posture of the HMD, light emitting devices and a camera may be provided.

In the conventional art, an open close time (frame) of a shutter of a camera is synchronized with an on/off time (frame) of light emitting devices of the HMD. More specifically, in the conventional art, a plurality of light emitting devices are disposed at any position on the HMD, and each of the plurality of light emitting devices is set to have a different on/off pattern. An 'on' state of the light emitting device means that the light emitting device emits light, whereas an 'off' state of the light emitting device means that the light emitting device does not emit light.

For example, assuming that an 'on' state of the light emitting device is '1', an 'off' state of the light emitting device is '0', and each on/off pattern has 10 frames, any first light emitting device among a plurality of light emitting devices is set to emit light so as to have a first pattern (e.g., '1100101011'), and any second light emitting device among the plurality of light emitting devices is set to emit light so as to have a second pattern (e.g., '1110010011').

Further, in the conventional art, the camera and the HMD are synchronized with each other such that an open close time (frame) of the shutter of the camera is synchronized with an on/off time (frame) of the light emitting devices of the HMD. Then, the on/off pattern of each of the plurality of light emitting devices is determined by the synchronized camera, thereby recognizing each light emitting device. And a posture of the HMD is determined by using the recognized light emitting device.

In case of using such a synchronization method, an additional configuration (e.g., synchronization cable) is required to synchronize an open close time (frame) of the shutter of the camera with an on/off time (frame) of the light emitting devices of the HMD. Thus, this configuration may increase the fabrication costs.

Furthermore, in case of using such a synchronization method, as the number of the light emitting devices of the HMD is increased, the number of frames to form the pattern is also increased. This may cause a long time to be taken to determine a posture of the HMD. Thus, various methods of determining a posture of the HMD are required nowadays.

SUMMARY OF THE INVENTION

Therefore, an aspect of the detailed description is to provide a head mounted display (HMD) having light emitting devices such that a posture of the HMD is determined in an optimum manner.

Another aspect of the detailed description is to provide a head mounted display (HMD) having light emitting devices such that a posture of the HMD is determined in a non-synchronized manner.

Another aspect of the detailed description is to provide a method of determining a posture of a head mounted display (HMD) in an optimum manner.

To achieve these and other advantages and in accordance with the purpose of this specification, as embodied and broadly described herein, there is provided a head mounted display including: a body having a plurality of surfaces; and a plurality of light emitting units, each of the plurality of light emitting units formed on a corresponding one of the plurality of surfaces and configured to emit light to outside of the body.

In an embodiment, each of the plurality of light emitting units includes at least four light emitting devices that are disposed in a straight line in a spaced manner such that a specific cross ratio defines spacing for each of the plurality of light emitting units, a cross ratio of one of the plurality of light emitting units being different from cross ratios of other light emitting units among the plurality of light emitting units.

In an embodiment, the specific cross ratio is determined based on a ratio of distances separating two adjacently located light emitting devices among the at least four light emitting devices; and each of the plurality of light emitting units is formed to have a different ratio of distances.

In an embodiment, a first ratio of distances separating two adjacently located light emitting devices among the at least four light emitting devices included in a first one of the plurality of light emitting units is different from a second ratio of distances separating two adjacently located light emitting devices among at least four light emitting devices included in a second one of the plurality of light emitting units.

In an embodiment, two of the at least four light emitting devices emit light in a first manner that is different from a second manner in which light is emitted from the rest of the at least four light emitting devices.

In an embodiment, the two light emitting devices are first light emitting devices that emit light of which brightness is changed at preset time intervals; and the rest of the at least four light emitting devices are second light emitting devices that emit light of a constant brightness.

In an embodiment, the first light emitting devices are light emitting devices that are arranged at two ends among the at least four light emitting devices; and the second light emitting devices are light emitting devices that are arranged between the first light emitting devices.

In an embodiment, the brightness of the light that is emitted from the first light emitting devices is changed to be greater than a preset brightness.

In an embodiment, each of the plurality of light emitting units further includes two third light emitting devices that are disposed at a position that is distant from the straight line and is configured to emit light of a constant brightness.

In an embodiment, the two third light emitting devices are arranged such that a straight line formed by any two among the first and second light emitting devices and a straight line formed by the two third light emitting devices are not parallel to each other.

In an embodiment, the any two among the first and second light emitting devices are the first light emitting devices.

In an embodiment, the two third light emitting devices included in one of the plurality of light emitting units are arranged to be located closer to any one among the first and second light emitting devices included in the one of the plurality of light emitting units than to any one among first to third light emitting devices included in a different one of the plurality of light emitting units.

In an embodiment, the two third light emitting devices included in the one of the plurality of light emitting units are arranged such that a distance from any one of the first light emitting devices included in the one of the plurality of light emitting units to any one of the two third light emitting devices is shorter than a distance from the first light emitting device included in the different one of the plurality of light emitting units to any one of the two third light emitting devices.

In an embodiment, a distance between one of the two third light emitting devices included in the one of the plurality of light emitting units and one of the two first light emitting devices included in the one of the plurality of light emitting units that is located closer to the one of the two third light emitting devices is shorter than distances between the third light emitting device and the first light emitting device that are included in the different one of the plurality of light emitting units.

In an embodiment, the first to third light emitting devices are arranged such that each of distances that separate any two of the first to third light emitting devices has a value that is greater than a preset value.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 4, 5, and 6 are conceptual views illustrating a position of light emitting devices on an HMD according to an embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A head mounted display (HMD) of the present invention may include a wearable device such as a glasses-type terminal (smart glass) and the like. The HMD presented herein may be implemented using a variety of different types of terminals. Examples of such terminals include cellular phones, smart phones, laptop computers, digital broadcast terminals, personal digital assistants (PDAs), portable multimedia players (PMPs), navigators, portable computers (PCs), slate PCs, tablet PCs, ultra books, wearable devices (for example, smart watches), and the like.

Figure 1:
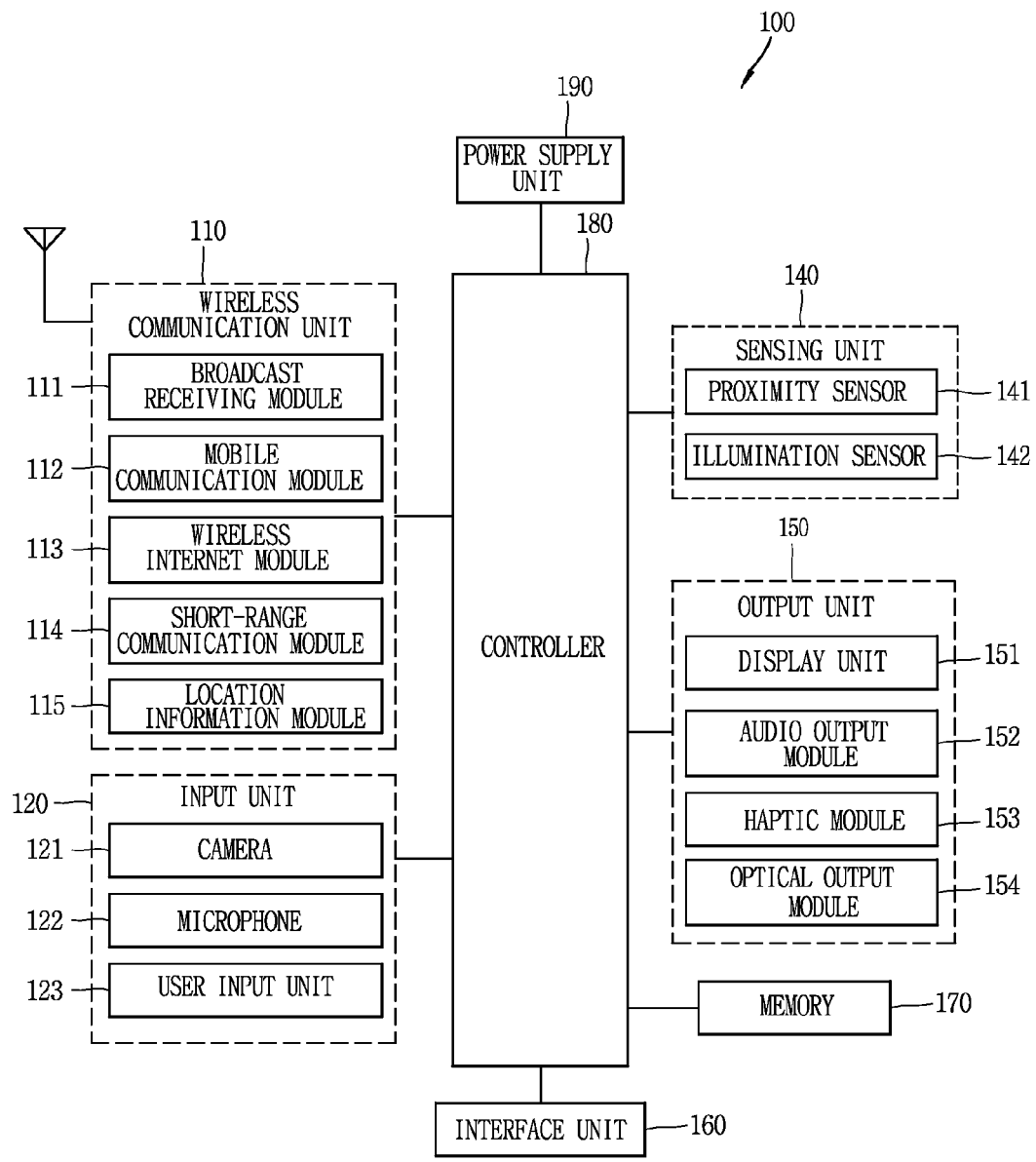
FIG. 1 is a block diagram illustrating a head mounted display (HMD) according to an embodiment of the present invention.

FIG. 1 is a block diagram of an HMD according to an embodiment of the present invention. The HMD 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented in the HMD 100.

Referring now to FIG. 1, the HMD 100 is shown having wireless communication unit 110 configured with several commonly implemented components. For instance, the wireless communication unit 110 typically includes one or more components which permit wireless communication between the HMD 100 and a wireless communication system or network within which the HMD 100 is located.

The wireless communication unit 110 typically includes one or more modules which permit communications such as wireless communications between the HMD 100 and a wireless communication system, communications between the HMD 100 and another mobile terminal, communications between the HMD 100 and an external server. Further, the wireless communication unit 110 typically includes one or more modules which connect the HMD 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the HMD 100, the surrounding environment of the HMD 100, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The HMD 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The interface unit 160 serves as an interface with various types of external devices that can be coupled to the HMD 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

The memory 170 is typically implemented to store data to support various functions or features of the HMD 100. For instance, the memory 170 may be configured to store application programs executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100 (for example, receiving a call, placing a call, receiving a message, sending a message, and the like). It is common for application programs to be stored in the memory 170, installed in the HMD 100, and executed by the controller 180 to perform an operation (or function) for the HMD 100.

The controller 180 typically functions to control overall operation of the HMD 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170. Alternatively, the controller 180 may operate at least two of the above components of the HMD 100 in a combined manner.

The power supply unit 190 can be configured to receive external power or provide internal power in order to supply appropriate power required for operating elements and components included in the HMD 100. The power supply unit 190 may include a battery, and the battery may be configured to be embedded in the terminal body, or configured to be detachable from the terminal body.

At least some of the above components may operate in a cooperating manner, so as to implement an operation or a control method of an HMD according to various embodiments to be explained later. The operation or the control method of the HMD may be implemented on the HMD by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the HMD 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the HMD 100 and a wireless communication system, communications between the HMD 100 and another HMD 100, or communications between the HMD and a network where another HMD 100 (or an external server) is located, via wireless area networks. One example of the wireless area networks is a wireless personal area networks.

In some embodiments, another HMD (which may be configured similarly to HMD 100) may be a wearable device, for example, a smart watch, a smart glass or a head mounted display (HMD), which is able to exchange data with the HMD 100 (or otherwise cooperate with the HMD 100). The short-range communication module 114 may sense or recognize the wearable device, and permit communication between the wearable device and the HMD 100. In addition, when the sensed wearable device is a device which is authenticated to communicate with the HMD 100, the controller 180, for example, may cause transmission of data processed in the HMD 100 to the wearable device via the short-range communication module 114. Hence, a user of the wearable device may use the data processed in the HMD 100 on the wearable device. For example, when a call is received in the HMD 100, the user may answer the call using the wearable device. Also, when a message is received in the HMD 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the HMD 100 uses a GPS module, a position of the HMD may be acquired using a signal sent from a GPS satellite. As another example, when the HMD 100 uses the Wi-Fi module, a position of the HMD can be acquired based on information related to a wireless access point (AP) which transmits or receives a wireless signal to or from the Wi-Fi module.

The input unit 120 may be configured to permit various types of input to the HMD 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the HMD 100. As another example, the cameras 121 may be located in a stereoscopic arrangement to acquire left and right images for implementing a stereoscopic image.

The microphone 122 is generally implemented to permit audio input to the HMD 100. The audio input can be processed in various manners according to a function being executed in the HMD 100. If desired, the microphone 122 may include assorted noise removing algorithms to remove unwanted noise generated in the course of receiving the external audio.

The user input unit 123 is a component that permits input by a user. Such user input may enable the controller 180 to control operation of the HMD 100. The user input unit 123 may include one or more of a mechanical input element (for example, a key, a button located on a front and/or rear surface or a side surface of the HMD 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the HMD at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the HMD 100 or execute data processing, a function or an operation associated with an application program installed in the HMD based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the HMD 100 covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the display unit 151. In addition, the controller 180 can control the HMD 100 to execute different operations or process different data according to whether a touch applied onto a point on the user input unit 123 is either a proximity touch or a contact touch.

A touch sensor can sense a touch applied to the user input unit 123, using any of a variety of touch methods. Examples of such touch methods include a resistive type, a capacitive type, an infrared type, and a magnetic field type, among others.

As one example, the touch sensor may be configured to convert changes of pressure applied to a specific part of the user input unit 123, or convert capacitance occurring at a specific part of the user input unit 123, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the user input unit 123 has been touched. Here, the touch controller may be a component separate from the controller 180, the controller 180, and combinations thereof.

In some embodiments, the controller 180 may execute the same or different controls according to a type of touch object that touches the user input unit 123. Whether to execute the same or different control according to the object which provides a touch input may be decided based on a current operating state of the HMD 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one of a camera sensor (CCD, CMOS etc.), a photo sensor (or image sensors), or a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the HMD 100. For example, the display unit 151 may display execution screen information of an application program executing at the HMD 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the HMD 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the HMD 100.

An optical output module 154 can output a signal for indicating an event generation using light of a light source. Examples of events generated in the HMD 100 may include message reception, call signal reception, a missed call, an alarm, a schedule notice, an email reception, information reception through an application, and the like.

A signal output by the optical output module 154 may be implemented in such a manner that the HMD 100 emits monochromatic light or light with a plurality of colors. The signal output may be terminated as the HMD 100 senses that a user has checked the generated event, for example.

The interface unit 160 serves as an interface for external devices to be connected with the HMD 100. For example, the interface unit 160 can receive data transmitted from an external device, receive power to transfer to elements and components within the HMD 100, or transmit internal data of the HMD 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HMD 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the HMD 100 via the interface unit 160.

When the HMD 100 is connected with an external cradle, the interface unit 160 can serve as a passage to allow power from the cradle to be supplied to the HMD 100 or may serve as a passage to allow various command signals input by the user from the cradle to be transferred to the HMD there through. Various command signals or power input from the cradle may operate as signals for recognizing that the HMD 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HMD 100 may also be operated in relation to a network storage device that performs the storage function of the memory 170 over a network, such as the Internet.

The controller 180 may typically control the general operations of the HMD 100. For example, the controller 180 may set or release a lock state for restricting a user from inputting a control command with respect to applications when a status of the HMD meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the HMD 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2A:
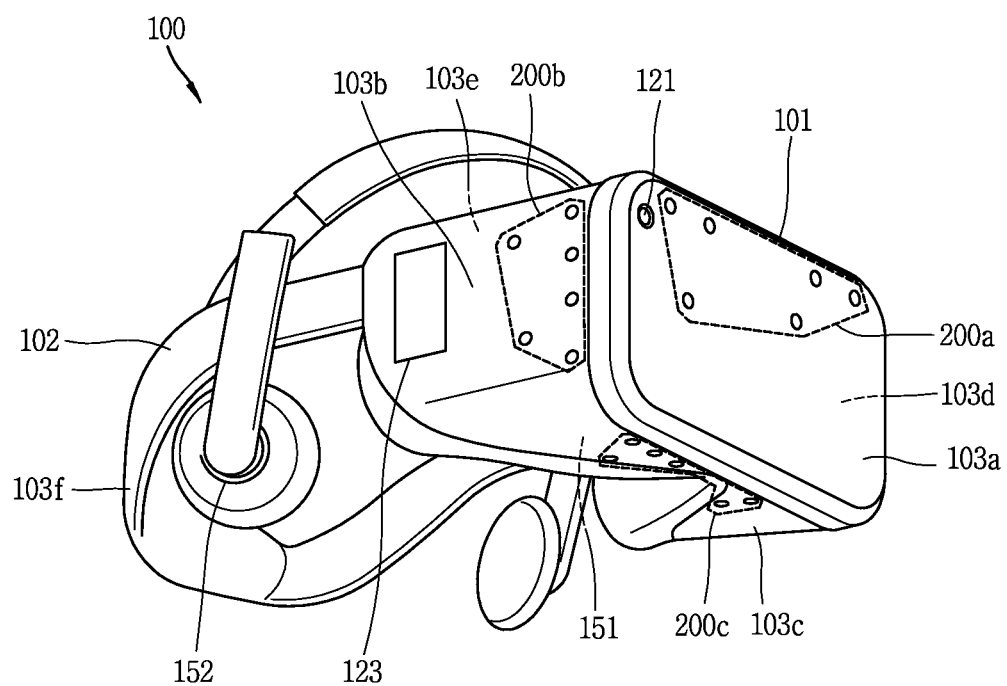
FIG. 2A is a conceptual view of an HMD viewed from one direction according to an embodiment of the present invention.

FIG. 2A is a conceptual view illustrating one example of an HMD 100 according to another exemplary embodiment. The HMD 100 is wearable on a head of a human body and provided with a frame (case, housing, etc.) therefor. The frame may be made of a flexible material to be easily worn. The frame of HMD 100 is shown having a first frame 101 and a second frame 102 which are formed of different materials.

For instance, the first frame 101 may provide a space where at least one of the components aforementioned in FIG. 1 is arranged, and the second frame 102 may support (fix) the first frame 101 on (to) a user's head.

The frame may be called a body (or HMD body). The HMD body may indicate the HMD 100 in the form of at least one assembly.

The frame may be supported on the head and defines a space for mounting various components. As illustrated, electronic components, such as the camera 121, the output unit 150, the user input unit 123, light emitting units 200a, 200b, 200c, the controller, and the sensing unit, may be mounted to the first frame 101. The display unit 151 may be formed to cover at least one of user's right and left eyes (or to face at least one of the user's right and left eyes), and may be detachably mounted.

Electronic components such as the audio output unit 152 and a light emitting unit 103f may be mounted to the second frame 102. However, the present invention is not limited to this. That is, the components aforementioned in FIG. 1, and components required at the HMD 100 may be variously arranged at the first frame 101 and the second frame 102 according to a user's selection.

The controller 180 (refer to FIG. 1) controls various electronic components disposed in the HMD 100. The controller 180 may be understood as a component corresponding to the controller 180 aforementioned in FIG. 1.

The display unit 151 is mounted to the frame, and outputs screen information (e.g., still images, moving images, etc.) in front of a user's eyes. In order to provide screen information directly in front of the user's eyes when the user wears the HMD 100, the display unit 151 may be located to correspond to at least one of the left and right eyes. FIG. 2A illustrates that the display unit 151 is located on a portion corresponding to the right and left eyes to output an image viewable by the user's right and left eye.

The display unit 151 may project an image into the user's eye using a prism. The prism may be formed from optically transparent material such that the user can view both the projected image and a general visual field (a range that the user views through the eyes) in front of the user.

In such a manner, the image output through the display unit 151 may be viewed while overlapping with the general visual field. The HMD 100 may provide an augmented reality (AR) by overlaying a virtual image on a realistic image or background using the display.

The camera 121 may be located adjacent to either or both of the left and right eyes to capture a front image. Since the camera 121 is located adjacent to the eye so as to face a front side, the camera 121 can acquire a scene that the user is currently viewing.

In the drawings, only one camera 121 is provided. However, the present invention is not limited to this. The camera 121 may be provided in plurality to acquire a stereoscopic image.

The HMD 100 may include a user input unit 123, which can be manipulated by the user to provide an input. The user input unit 123 may employ techniques which permit input via a tactile input. Typical tactile inputs include a touch, push, or the like. The user input unit 123 is shown operable in a pushing manner and a touching manner as they are located on the frame.

If desired, the HMD 100 may include a microphone (not shown) which processes input sound into electric audio data, and the audio output module 152 for outputting audio. The audio output module 152 may be configured to produce audio in a general audio output manner or an osteoconductive manner. When the audio output module 152 is implemented in the osteoconductive manner, the audio output module 152 may be closely adhered to the head when the user wears the HMD 100 and vibrate the user's skull to transfer sounds.

If the frame including the first frame 101 and the second frame 102 is a single HMD body (hereinafter, will be referred to as 'body'), the body of the HMD according to the present invention may be implemented in various manners. More specifically, the body may include a plurality of surfaces 103a, 103b, 103c formed to have a preset angle therebetween. The plurality of surfaces mean surfaces positioned at an outer side of the body of the HMD 100. Thus, the plurality of surfaces may mean the surface of the HMD 100 (external surface, outer surface, etc.). Each of the plurality of surfaces 103a, 103b, 103c may be formed to be flat or bent.

The display unit 151 of the HMD 100 according to an embodiment of the present invention may be positioned in the body. More specifically, the display unit 151 may be arranged in the HMD 100, at a position where the display unit 151 faces a user's eyes when the HMD is worn on the user's head.

FIG. 2A illustrates a body where a plurality of surfaces 103a, 103b, 103c are formed to be perpendicular to each other. Hereinafter, the present invention will be explained taking an HMD 100 where a plurality of surfaces 103a, 103b, 103c are formed to be perpendicular to each other, as an example. However, the present invention is also applicable to an HMD 100 having a plurality of surfaces each formed to have a predetermined angle.

The second frame 102 may include a plurality of surfaces. In the present invention, it should be understood that one surface 103f included in the second frame 102 is included in a plurality of surfaces of the body of the HMD 100. The surface 103f may be positioned on a user's rear head portion.

For instance, referring to FIG. 2A, the HMD 100 may include a plurality of surfaces. The plurality of surfaces may include a front surface 103a, a left side surface 103b, a lower side surface 103c, a right side surface 103d, an upper side surface 103e, and a rear surface 103f.

The HMD 100 may include a plurality of light emitting units each formed on a corresponding one of the plurality of surfaces, wherein the plurality of light emitting units are configured to emit light to the outside of the body. The context that the plurality of light emitting units are formed on the plurality of surfaces should be understood that a single light emitting unit, not a plurality of light emitting units, is formed on each surface.

For instance, as shown in FIG. 2A, a first light emitting unit 200a may be provided on the front surface 103a, a second light emitting unit 200b may be provided on the left side surface 103b, and a third light emitting unit 200c may be provided on the lower side surface 103c. Although not shown, more light emitting units may be provided on the right side surface 103d, the upper side surface 103e, and the rear surface 103f.

The plurality of light emitting units may be used to determine (estimate, detect, trace, extract, recognize, identify, etc.) a posture of the HMD 100. For instance, the HMD 100 may include a controller 180 for determining a posture of the HMD 100. The controller 180 may determine a posture of the HMD 100 by using a plurality of light emitting units formed on a plurality of surfaces of the HMD 100.

A posture of the HMD 100 may be understood to include a state of the HMD (a worn state of the HMD on a user's head), a tilted degree of the HMD, a direction of the HMD, a position of the HMD, a rotation of the HMD, a movement of the HMD, and the like. Also, determining a posture of the HMD 100 may mean determining a posture, a movement, and the like of a user who is wearing the HMD 100.

A method of determining a posture of the HMD 100 by the controller 180 by using the plurality of light emitting units of the HMD will be explained in more detail with reference to FIGS. 3A to 3C, FIGS. 7A and 7B, and FIG. 8.

Each of the plurality of light emitting units may include a plurality of light emitting devices. A plurality of light emitting devices of one light emitting unit may be formed to have a different pattern (arrangement) from a pattern of a plurality of light emitting devices of another light emitting unit, such that a plurality of surfaces are distinguished from each other.

For instance, a plurality of light emitting devices included in the first light emitting unit 200a provided on the front surface 103a may have a pattern that is different from a pattern of a plurality of light emitting devices included in the second light emitting unit 200b provided on a surface that is different from the front surface 103a (e.g., the left side surface 103b).

The controller 180 may recognize a light emitting unit based on a plurality of light emitting devices disposed on a plurality of surfaces with different patterns, and may determine a posture of the HMD 100 based on the recognized light emitting unit.

Figure 2B:
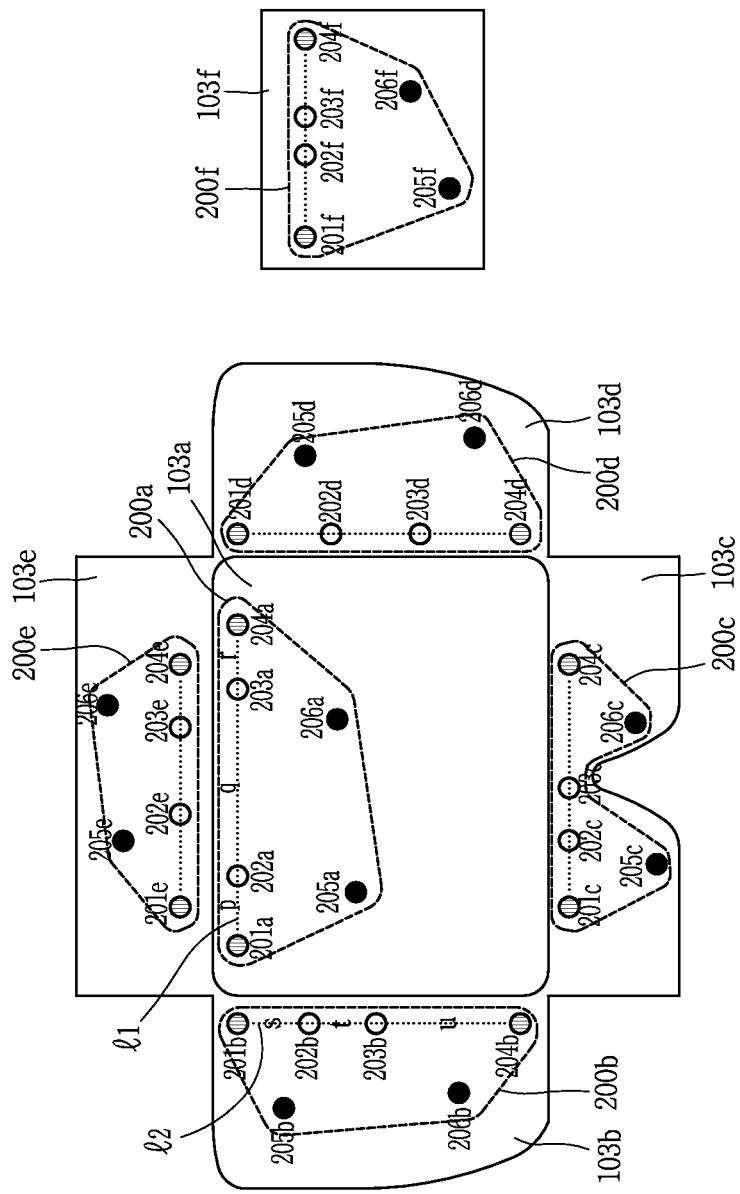
FIG. 2B is a conceptual view illustrating light emitting devices of an HMD according to an embodiment of the present invention.

Hereinafter, the light emitting units disposed on a plurality of surfaces of the body of the HMD 100 according to an embodiment of the present invention will be explained in more detail with reference to FIG. 2B. FIG. 2B is a conceptual view illustrating light emitting devices of the HMD 100.

A plurality of light emitting devices included in each light emitting unit may include various devices. Any devices for emitting light may be adopted as the light emitting devices. For instance, infrared ray devices, light emitting diode (LED) devices, and the like may be used as the light emitting devices.

Each of a plurality of light emitting units 200a, 200b, 200c, 200d, 200e, 200f may include at least four light emitting devices that are spaced apart from each other on or along a straight line, such that a specific cross ratio is determined for the light emitting unit.

The context that at least four light emitting devices are arranged on a straight line may mean that the at least four light emitting devices are arranged along a line, or the at least four light emitting devices are arranged in one direction.

For instance, referring to FIG. 2B, the first light emitting unit 200a, provided on one surface among a plurality of surfaces of the body of the HMD 100 (e.g., the front surface 103a), may include at least four light emitting devices 201a, 202a, 203a, 204a spaced from each other on a straight line. And the second light emitting unit 200b, provided on another surface among the plurality of surfaces (e.g., the left side surface 103b), may include at least four light emitting devices 201b, 202b, 203b, 204b spaced from each other on a straight line. Likewise, a light emitting unit, provided on each of the lower side surface 103c, the right side surface 103d, the upper side surface 103e, and the rear surface 103f, may include at least four light emitting devices spaced from each other on a straight line. For convenience, it will be explained hereinafter that a light emitting unit is provided on each of the front surface 103a and the left side surface 103b.

However, a light emitting unit may be provided on any surface among a plurality of surfaces provided at the body of the HMD 100.

Cross ratios of a plurality of light emitting units may be different from each other such that the plurality of surfaces are distinguished from each other. The cross ratio may be determined based on at least four light emitting devices that are spaced apart from each other on a straight line. More specifically, the cross ratio may be determined based on distances between two adjacent light emitting devices among at least four light emitting devices or based on a ratio of the distances.

That is, at least four light emitting devices 201a, 202a, 203a, 204a of the first light emitting unit 200a may be arranged on a straight line in a spaced manner, such that the first light emitting unit 200a has a first cross ratio. At least four light emitting devices 201b, 202b, 203b, 204b of the second light emitting unit 200b that is different from the first light emitting unit may be arranged on a straight line in a spaced manner, such that the second light emitting unit 200b has a second cross ratio that is different from the first cross ratio.

Each of the plurality of light emitting units may further include at least two light emitting devices disposed at a position that is distant from the straight line where the at least four light emitting devices are disposed. For instance, referring to FIG. 2B, the first light emitting unit 200a provided on one of a plurality of surfaces (e.g., the front surface 103a) may further include at least two light emitting devices 205a, 206a that are disposed at a position that is distant from the straight line (l1) where the at least four light emitting devices 201a, 202a, 203a, 204a are disposed.

Likewise, the second light emitting unit 200b provided on another surface among the plurality of surfaces (e.g., the left side surface 103b) may further include at least two light emitting devices 205b, 206b that are disposed at a position that is distant from the straight line (l2) where the at least four light emitting devices 201b, 202b, 203b, 204b are disposed.

The at least two light emitting devices disposed at a position that is distant from the straight line may be used to determine a posture of the HMD 100 by the controller 180. The at least two light emitting devices disposed at a position that is distant from the straight line will be explained in more detail with reference to FIGS. 4 to 6.

Hereinafter, a cross ratio will be explained in more detail. The cross ratio may be called a double ratio or an anharmonic ratio. The cross ratio indicates a projective constant of four points disposed on the same straight line, in a projective geometry. More specifically, the cross ratio may be a value (number) related to four points on the same line.

For instance, assuming that four points (points A, B, C and D) are sequentially disposed on the same line (or a straight line) in a spaced manner, a cross ratio of the four points (A, B; C, D) may be defined as the following formula 1.

$$(A, B; C, D) = \frac{d_{AC} * d_{BD}}{d_{BC} * d_{AD}} \quad \text{[Formula 1]}$$

Here, $d_{AC}$ indicates a separation distance between A and C, duo indicates a separation distance between B and D, $d_{BC}$ indicates a separation distance between B and C, and $d_{AD}$ indicates a separation distance between A and D.

That is, a cross ratio of the four points (A, B; C, D) may be determined by separation distances among the points. Also, the cross ratio of the four points (A, B, C, D) may be determined based on a ratio of separation distances among the points.

For instance, in a case where a ratio among a separation distance between A and B ($d_{AB}$), a separation distance between B and C ($d_{BC}$), and a separation distance between C and D ($d_{CD}$) ($d_{AB}$:$d_{BC}$:$d_{CD}$) is p:q:r (p, q and r denotes real numbers), the cross ratio among A, B, C and D (A, B; C, D) may be $\{(p+q)*(q+r)\}/\{q*(p+q+r)\}$.

Based on a point (P) spaced from the straight line where the four points (A, B, C and D) are disposed, A' may be disposed on a projective line connecting the A and the point (P), B' may be disposed on a projective line connecting the B and the point (P), C' may be disposed on a projective line connecting the C and the point (P), and D' may be disposed on a projective line connecting the D and the point (P). If it is assumed that the A', B', C' and D' are disposed on the same line (straight line), a cross ratio among the A', B', C' and D' (A',B';C',D') may be defined as the following formula 2.

$$(A', B'; C', D') = \frac{d_{A'C'} * d_{B'D'}}{d_{B'C'} * d_{A'D'}} \quad \text{[Formula 2]}$$

Here, $d_{A'C'}$ indicates a distance between A' and C', $d_{B'D'}$ indicates a distance between B' and D', $d_{B'C'}$ indicates a distance between B' and C', and $d_{A'D'}$ indicates a distance between A' and D'.

Referring to the formulas 1 and 2, even if the $d_{AC}$ and $d_{A'C'}$ are different from each other, the $d_{BD}$ and $d_{B'D'}$ are different from each other, the $d_{BC}$ and $d_{B'C'}$ are different from each other, and the $d_{AD}$ and $d_{A'D'}$ are different from each other, the cross ratio among A, B, C and D (A, B; C, D) is the same as the cross ratio among A', B', C' and D' (A', B; C', D').

That is, crossing points between four projective lines (e.g., 1~4 projective lines) passing through one point (P) and non-parallel to each other, and a first straight line not passing through the one point (P) and crossing the four projective lines are defined as A, B, C and D.

Further, crossing points between the four projective lines and a second straight line not passing through the one point (P) and crossing the four projective lines are defined as A', B', C' and D'.

It is assumed that A' and A are disposed on the same projective line (e.g., first projective line), B' and B are disposed on the same projective line (e.g., second projective line), C' and C are disposed on the same projective line (e.g., third projective line), and D' and D are disposed on the same projective line (e.g., fourth projective line).

In this case, the cross ratio among A, B, C and D (A,B;C,D) is the same as the cross ratio among A', B', C' and D' (A',B';C',D').

That is, a cross ratio among four crossing points disposed on four projective lines passing through one point (P) and non-parallel to each other, and crossing an arbitrary straight line, is always constant.

In the present invention, a posture of the HMD 100, and a plurality of surfaces of the body of the HMD may be recognized based on the aforementioned cross ratio. That is, the aforementioned points (A, B, C and D) may correspond to at least four light emitting devices arranged on a straight line in a spaced manner and included in a light emitting unit.

As aforementioned, each of a plurality of light emitting units formed on a corresponding one of a plurality of surfaces may include at least four light emitting devices arranged on a straight line in a spaced manner, such that a specific cross ratio is determined.

In the present invention, cross ratios of a plurality of light emitting units may be different from each other such that a plurality of surfaces are distinguished from each other. The cross ratio of each of the plurality of light emitting units may mean a cross ratio determined by at least four light emitting devices included in the light emitting unit and disposed on a straight line in a spaced manner.

More specifically, the cross ratio may be determined based on a ratio of distances between two adjacent light emitting devices among at least four light emitting devices. Each of the plurality of light emitting units may be formed such that a ratio of distances is different for a different cross ratio.

That is, a ratio of distances among at least four light emitting devices included in one of the plurality of light emitting units may be different from a ratio of distances among at least four light emitting devices included in another one of the plurality of light emitting units.

For instance, referring to FIG. 2B, a ratio of distances among at least four light emitting devices (e.g., 201a, 202a, 203a, 204a) included in one of the plurality of light emitting units (e.g., the first light emitting unit 200a) provided on one of a plurality of surfaces (e.g., the front surface 103a) and disposed on a straight line (l1) in a spaced manner, may be a first ratio (p:q:r). Here, p, q and r are real numbers.

In this case, a ratio of distances among at least four light emitting devices (e.g., 201b, 202b, 203b, 204b) included in another one of the plurality of light emitting units (e.g., the second light emitting unit 200b) provided on another one of the plurality of surfaces (e.g., the left side surface 103b) and disposed on a straight line (l2) in a spaced manner, may be a second ratio (s:t:u). Here, s, t and u are real numbers.

The context that each of the plurality of light emitting units is formed such that a ratio of distances among at least four light emitting devices is different does not mean that the distances among the at least four light emitting devices included in one of the plurality of light emitting units and disposed on a straight line in a spaced manner are different from each other. Rather, the context means that a ratio of distances (p:q:r) among at least four light emitting devices included in the first light emitting unit and disposed on a straight line in a spaced manner, is different from a ratio of distances (s:t:u) among at least four light emitting devices included in the second light emitting unit and disposed on a straight line in a spaced manner.

The p, q and r may be the same, or at least one thereof may be different. Likewise, the s, t and u may be the same, or at least one thereof may be different. That is, the p, q, r, s, t and u may be determined such that a ratio of distances (p:q:r) among at least four light emitting devices included in the first light emitting unit and disposed on a straight line in a spaced manner, is different from a ratio of distances (s:t:u) among at least four light emitting devices included in the second light emitting unit and disposed on a straight line in a spaced manner.

For instance, it is assumed that a ratio of distances among at least four light emitting devices included in the first light emitting unit and disposed on a straight line in a spaced manner, is (1:2:1), and a ratio of distances among at least four light emitting devices included in the second light emitting unit and disposed on a straight line in a spaced manner is (1:1:2). In this case, it may be understood that the ratios are different from each other. Thus, a cross ratio of light emitting units arranged such that a ratio of distances is (1:2:1) is different from a cross ratio of light emitting units arranged such that a ratio of distances is (1:1:2).

On the other hand, if ratios of separation distances are (2:1:1) and (1:1:2), it may be understood that the ratios are the same, since the same cross ratio is implemented. In summary, the HMD 100 according to an embodiment of the present invention includes at least four light emitting devices 201~204 disposed on a corresponding one of a plurality of surfaces 103a~103f and spaced from each other on a corresponding straight line. The at least four light emitting devices may be spaced from each other on a straight line such that a ratio of distances among the at least four light emitting devices is different for each surface.

Hereinafter, a method of recognizing (identifying) a plurality of surfaces of the HMD 100 using at least four light emitting devices arranged such that each of the plurality of surfaces of the body of the HMD 100 has a different cross ratio, will be explained in more detail with reference to FIGS. 3A to 3C.

Figure 3A:
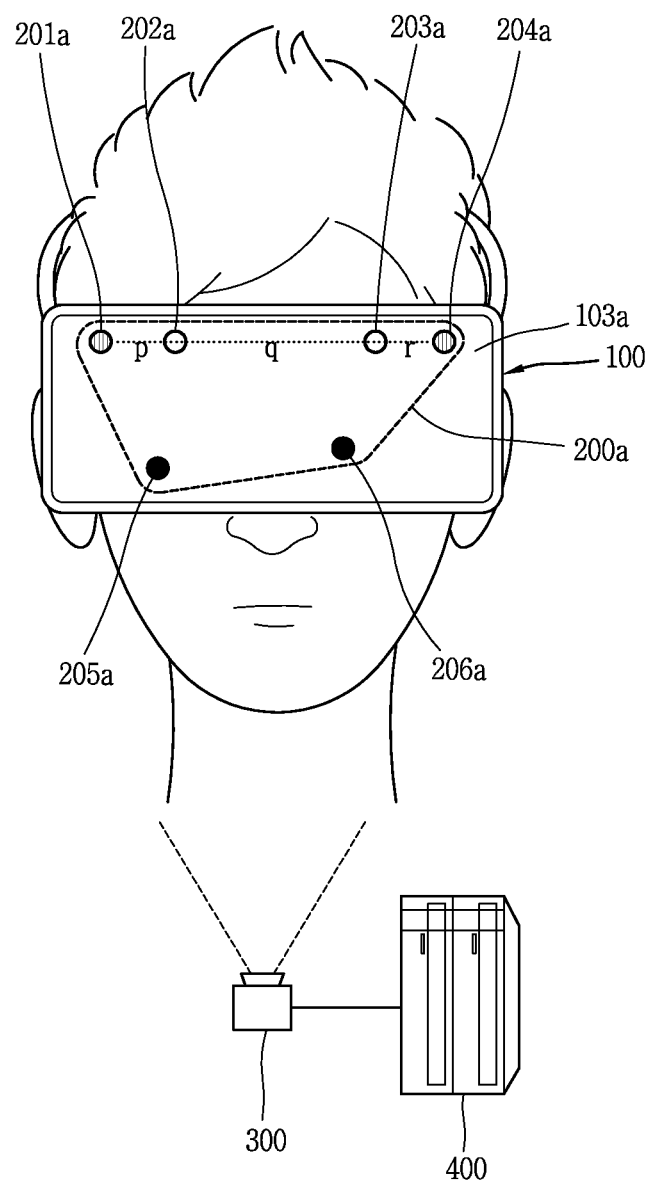
FIGS. 3A to 3C are conceptual views illustrating a cross ratio used to distinguish a plurality of surfaces of an HMD from each other according to an embodiment of the present invention.
Figure 3B:
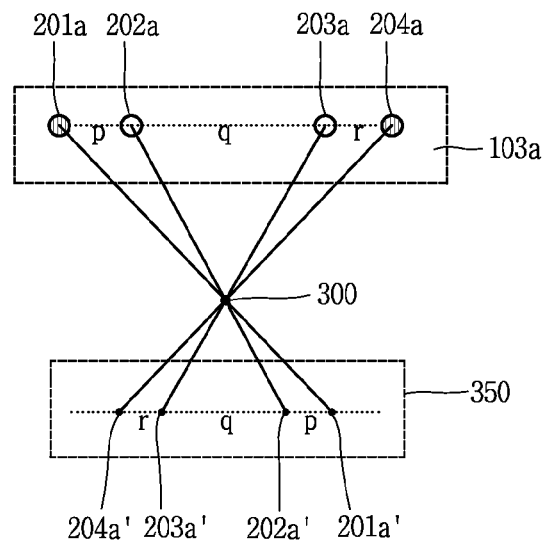
Figure 3C:
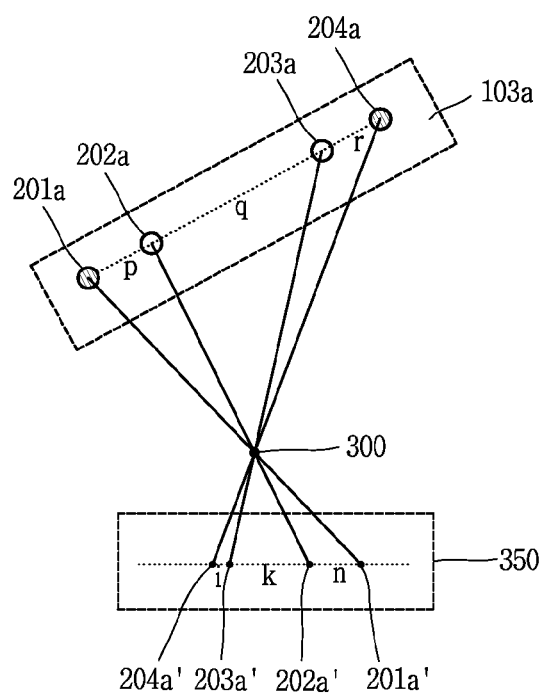

FIGS. 3A to 3C are conceptual views illustrating cross ratios used to distinguish a plurality of surfaces of the HMD from each other. Referring to FIG. 3A, in order to determine a posture of the HMD 100, the HMD 100 may include a camera 300 provided outside the HMD 100, a control device 400 configured to determine a posture of the HMD 100 based on an image (information, data, and the like) received via the camera 300.

In this specification, for convenience, the control device 400 which can communicate with the HMD 100 is configured to determine a posture of the HMD. However, the present invention is not limited to this. That is, the HMD 100 may receive an image from the camera 300, and may determine a posture thereof based on the received image.

The camera 300 may be provided to capture the HMD 100 outside the HMD 100. The camera 300, arranged to face the HMD 100, may receive an image including a graphic object corresponding to the HMD 100. The camera 300 may be controlled by at least one of the HMD 100 or the control device 400.

The camera 300 may include various types of cameras. The camera 300 may include all types of cameras which can sense light emitted from light emitting devices of the HMD 100. For example, the camera 300 may include an infrared ray camera.

As shown in FIG. 3A, the HMD 100 may include a plurality of surfaces, and each of the plurality of surfaces may include a light emitting unit 200a including at least four light emitting devices 201a, 202a, 203a, 204a disposed on a straight line in a spaced manner such that a specific cross ratio is determined.

FIG. 3A illustrates that the camera 300 is arranged to capture one of a plurality of surfaces of the HMD 100 (e.g., the front surface 103a). FIG. 3A also illustrates that a ratio of distances among the at least four light emitting devices 201a, 202a, 203a, 204a disposed on the one surface 103a is (p:q:r). Although not shown, at least four light emitting devices may be disposed on a straight line in a spaced manner, on each of the plurality of surfaces, such that a different ratio of distances is determined for each of the plurality of surfaces.

The control device 400 may determine a posture of the HMD 100 based on information (e.g., preview image) received via the camera 300. More specifically, the control device 400 may sense light emitted from light emitting devices of the HMD 100 via the camera 300, and may recognize one of a plurality of surfaces which is captured by the camera 300 (i.e., a surface disposed to face the camera 300).

The control device 400 may calculate a cross ratio of at least four light emitting devices arranged on a straight line in a spaced manner, based on light received via the camera 300. Then, the control device 400 may recognize a surface captured by the camera 300, among the plurality of surfaces, based on the calculated cross ratio.

FIGS. 3B and 3C illustrate one of the plurality of surfaces provided at the body of the HMD 100, e.g., the front surface 103*a*.

The controller 180 of the HMD 100 may control light emitting devices of the HMD 100 to emit light based on whether preset conditions are satisfied. The satisfied preset conditions may include turning on power of the HMD 100, receiving a user's control command, executing a function related to a posture of the HMD 100 among functions of the HMD 100, receiving a light emitting control signal from the control device 400 (or the camera 300), and the like.

The control device 400 may sense light emitted from the HMD 100 via the camera 300. The camera 300 may be converted to an activated state (or 'on' state) from a deactivated state (or 'off' state) as the preset conditions are satisfied.

Based on a characteristic of light (rectilinear propagation), light emitted from the at least four light emitting devices 201*a*, 202*a*, 203*a*, 204*a* disposed on a straight line in a spaced manner is made to be incident onto the camera 300 (or a camera lens). The camera 300 may correspond to the one point (P) aforementioned with respect to a cross ratio in FIG. 2B.

The control device 400 may set at least four crossing points (201*a*', 202*a*', 203*a*', 204*a*') where paths of the received light cross an arbitrary straight line on an image 350 received via the camera 300 based on the received light. Then, the control device 400 may calculate a cross ratio based on a ratio of distances among the at least four crossing points (201*a*', 202*a*', 203*a*', 204*a*'), and may recognize one of a plurality of surfaces of the HMD 100, the surface arranged to face the camera 300.

For instance, as shown in FIG. 3B, in a case where a virtual line extending from the camera 300 (or camera lens) is perpendicular to one of a plurality of surfaces provided at the body of the HMD 100 (e.g., the front surface 103*a*), a ratio of distances among at least four light emitting devices (201*a*, 202*a*, 203*a*, 204*a*) disposed on the one surface on a straight line in a spaced manner, may be the same as a ratio (p:q:r) of distances among the at least four crossing points (201*a*', 202*a*', 203*a*', 204*a*'). The control device 400 may calculate a cross ratio based on the ratio (p:q:r) of distances among the at least four crossing points (201*a*', 202*a*', 203*a*', 204*a*'), and may recognize a plurality of surfaces of the HMD 100 based on the calculated cross ratio. Referring to FIG. 3B, the control device 400 may recognize, based on the calculated cross ratio, that the front surface 103*a* is captured by the camera 300 (i.e., the front surface 103*a* is arranged to face the camera 300) among a plurality of surfaces of the HMD 100.

As another example, as shown in FIG. 3C, in a case where a virtual line extending from the camera 300 (or camera lens) is not perpendicular to one of a plurality of surfaces provided at the body of the HMD 100 (e.g., the front surface 103*a*), e.g., in a case where the HMD is inclined or rotated, a ratio (p:q:r) of distances among at least four light emitting devices (201*a*, 202*a*, 203*a*, 204*a*) disposed on the one surface on a straight line in a spaced manner may be different from a ratio (n:k:i) of distances among the at least four crossing points (201*a*', 202*a*', 203*a*', 204*a*'). Here, the n, k and i are real numbers. That is, when the HMD 100 is inclined or rotated based on the camera 300, the ratio (p:q:r) of distances among the at least four light emitting devices (201*a*, 202*a*, 203*a*, 204*a*), which are disposed on the one surface on a straight line in a spaced manner and viewed from the camera 300, is changed.

However, even if the ratio (p:q:r) is different from the ratio (n:k:i), the at least four light emitting devices (201*a*, 202*a*, 203*a*, 204*a*) and the at least four crossing points (201*a*', 202*a*', 203*a*', 204*a*') are disposed on projective lines (paths of light) passing through the one point (P) of the camera 300 and non-parallel to each other.

As a result, a cross ratio of the at least four light emitting devices (201*a*, 202*a*, 203*a*, 204*a*) having the ratio (p:q:r) is the same as a cross ratio of the at least four crossing points (201*a*', 202*a*', 203*a*', 204*a*') having the ratio (n:k:i). The control device 400 may calculate a cross ratio based on the ratio (n:k:i) of distances among the at least four crossing points (201*a*', 202*a*', 203*a*', 204*a*'), and may recognize a plurality of surfaces of the HMD 100 based on the calculated cross ratio. Referring to FIG. 3C, the control device 400 may recognize, based on the calculated cross ratio, that the front surface 103*a* is captured by the camera 300 (i.e., the front surface 103*a* is arranged to face the camera 300) among a plurality of surfaces of the HMD 100.

With such a configuration, even if the HMD 100 is rotated or inclined, a plurality of surfaces can be precisely recognized (identified) based on a cross ratio. Further, according to an embodiment of the present invention, the HMD 100 is provided with at least four light emitting devices disposed on each of a plurality of surfaces on a straight line in a spaced manner such that each of the plurality of surfaces is recognized.

Hereinafter, a position of light emitting devices on the HMD 100, and a method of emitting light by the light emitting devices will be explained in more detail with reference to the attached drawings.

Figure 4:
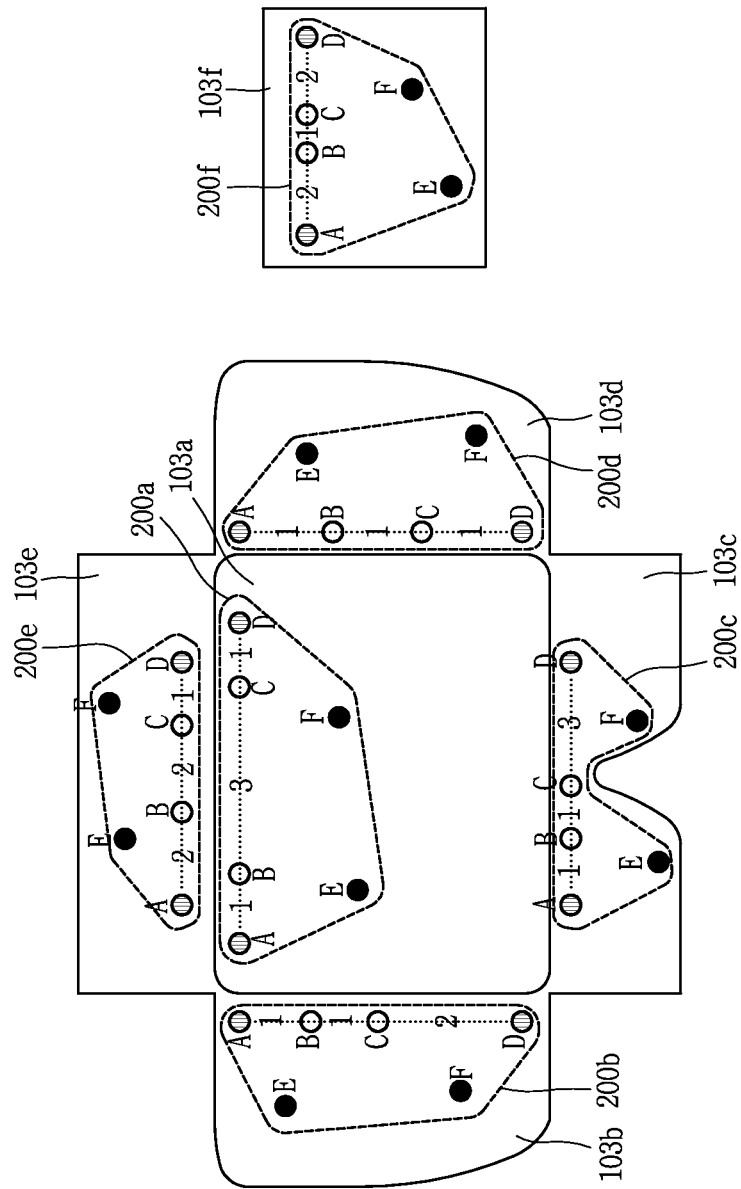
Figure 5:
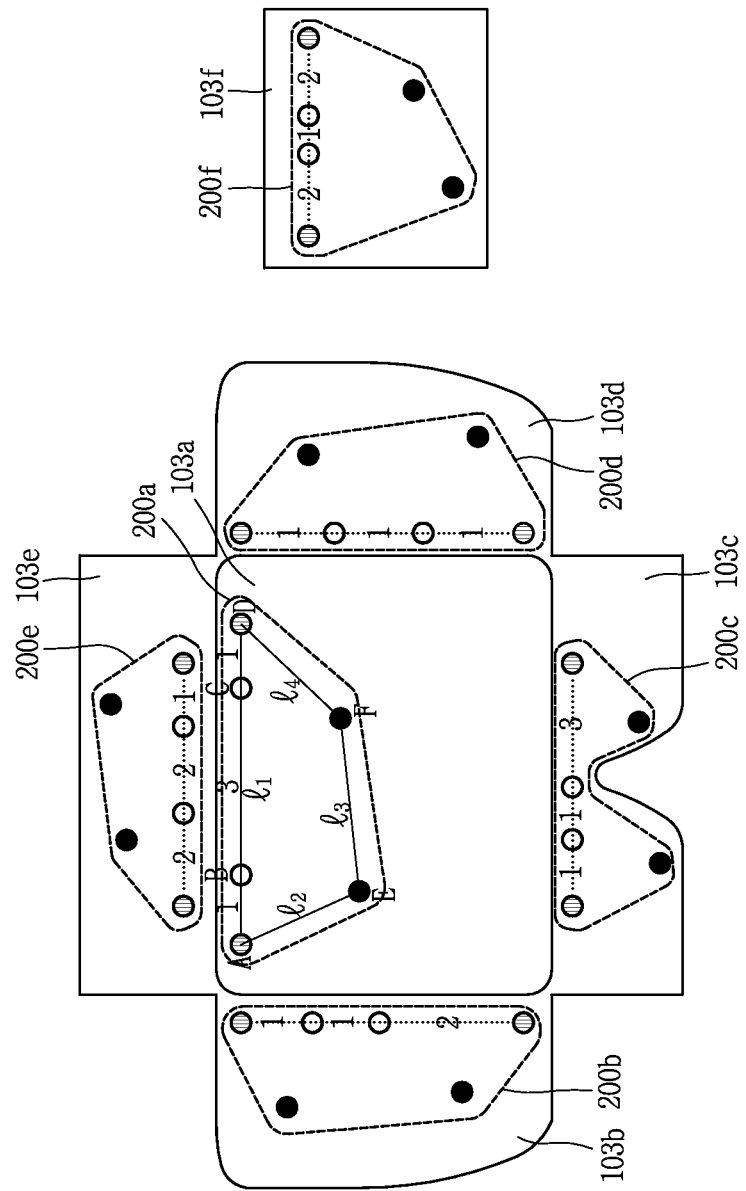

FIGS. 4, 5, and 6 are conceptual views illustrating a position of light emitting devices on the HMD.

The HMD 100 according to an embodiment of the present invention may include a plurality of light emitting units on a plurality of surfaces, and each of the plurality of light emitting units may include at least four light emitting devices arranged on a straight line in a spaced manner.

Cross ratios of the plurality of light emitting units may be different from each other. More specifically, the plurality of light emitting units may be formed such that a ratio of distances among at least four light emitting devices formed on one of the plurality of light emitting units is different from a ratio of distances among at least four light emitting devices formed on a different one of the plurality of light emitting units, for different cross ratios of the plurality of light emitting units.

In an embodiment, referring to FIG. 4, a ratio of distances among at least four light emitting devices formed on one of the plurality of light emitting units on a straight line in a spaced manner may be shown in the following table 1.

TABLE 1

| A plurality of surfaces | Ratio of distances (AB:BC:CD) | Cross ratio (AC*BD)/(BC*AD) |
|---|---|---|
| Front surface (103a) | 1:3:1 | 1.06 |
| Left side surface (103b) | 1:1:2 | 1.5 |

TABLE 1-continued

| A plurality of surfaces | Ratio of distances (AB:BC:CD) | Cross ratio (AC*BD)/(BC*AD) |
|---|---|---|
| Lower side surface (103c) | 1:1:3 | 1.6 |
| Right side surface (103d) | 1:1:1 | 1.33 |
| Upper side surface (103e) | 2:2:1 | 1.2 |
| Rear surface (103f) | 2:1:2 | 1.8 |

As shown in FIG. 4, A, B, C, D mean at least four light emitting devices disposed on each of a plurality of surfaces on a straight line in a spaced manner. AB, BC, CD, AC, BD, BC and AD mean a ratio of distances among the light emitting devices.

The at least four light emitting devices included in the HMD 100 are not limited to those shown in Table 1. The HMD 100 may be included within the scope of the present invention, only if at least four light emitting devices, disposed on each of a plurality of surfaces on a straight line in a spaced manner, are arranged to have a different cross ratio.

Referring to FIGS. 4 and 5, reference numerals of light emitting devices disposed on the front surface 103a are A, B, C, D, E and F, rather than 201a, 202a, 203a, 204a, 205a and 206a. Light emitting devices disposed on the left side surface 103b, the lower side surface 103c, the right side surface 103d, the upper side surface 103e and the rear surface 103f, also have the same reference numerals as the light emitting devices disposed on the front surface 103a. Hereinafter, the present invention will be explained based on the front surface 103a. Explanations about the front surface 103a may be applicable to explanations about other surfaces among the plurality of surfaces of the body (e. g, the left side surface 103b, the lower side surface 103c, the right side surface 103d, the upper side surface 103e or the rear surface 103f), in the same manner or in a similar manner.

Each of a plurality of light emitting units (200a, 200b, 200c, 200d, 200e, 200f) provided on a corresponding one of a plurality of surfaces (103a, 103b, 103c, 103d, 103e, 103f) may include at least four light emitting devices (A, B, C, D) disposed on a straight line in a spaced manner. Two of the at least four light emitting devices (A, B, C, D) may emit light in a different manner from the rest of the at least four light emitting devices.

The two light emitting devices may emit light such that brightness of the light is changed at preset time intervals. Hereinafter, the two light emitting devices are called 'first light emitting devices'. Also, the first light emitting devices (the two light emitting devices) may be called 'blink light emitting devices', since they emit light such that brightness of the light is changed at preset time intervals.

The rest of the at least four light emitting devices may emit light such that the light has a constant brightness. Hereinafter, the rest of the at least four light emitting devices is called 'second light emitting devices'. Also, the second light emitting devices (the rest of the light emitting devices) may be called 'static light emitting devices' since they emit light such that the light has a constant brightness.

The first light emitting devices, which are configured to emit light such that brightness of the light is changed at preset time intervals, may be light emitting devices (A, D) arranged at both ends among the at least four light emitting devices (A, B, C, D). In this case, the second light emitting devices may be light emitting devices arranged between the first light emitting devices (A, D).

However, the present invention is not limited to this. That is, the first light emitting devices may be any two among the at least four light emitting devices (A, B, C, D). For instance, if the first light emitting devices are B, D, the rest of the light emitting devices may be A, C which are disposed on a straight line with the first light emitting devices. Hereinafter, for convenience, it is assumed that the first light emitting devices are A, D and the second light emitting devices are B, C.

According to an embodiment of the present invention, the first light emitting devices may emit light such that brightness of the light is changed at more than a predetermined brightness. That is, the controller 180 may cause the first light emitting devices to emit light such that brightness of the light is changed at more than a predetermined brightness.

For instance, when the preset brightness is 50% of a maximum brightness of the light emitting devices, the first light emitting devices (A, D) are not turned on/off at preset time intervals. Rather, the first light emitting devices (A, D) may emit light such that brightness of the light is changed at the preset time intervals, at more than a preset brightness (50%) (e.g., 50%→100%→50%→100% . . . ). The reason why the controller 180 causes the two light emitting devices 201a, 204a to emit light such that brightness of the light is changed at the preset time intervals at more than a preset brightness is in order for the control device 400 to continuously trace (identify) the two light emitting units 201a, 204a.

However, the present invention is not limited to this. That is, the first light emitting devices may emit light by being turned on and then turned off at preset time intervals.

Each of the plurality of light emitting units (200a, 200b, 200c, 200d, 200e, 200f) may further include at least two light emitting devices (E, F) disposed at a position that is distant from the straight line.

The at least two light emitting devices (E, F) may be called third light emitting devices disposed at a position that is distant from the straight line, and configured to emit light having a predetermined brightness. The third light emitting devices may be called 'static light emitting devices' since they emit light having a predetermined brightness like the second light emitting devices.

The second light emitting devices (B, C) and the third light emitting devices (E, F) may emit light of the same brightness, or may emit light of different brightness.

The third light emitting devices (E, F) are used to determine a posture of the HMD 100. More specifically, the control device 400 (refer to FIG. 3A) for determining a posture of the HMD 100 may calculate a cross ratio using at least four light emitting devices (A, B, C, D) (i.e., first and second light emitting devices) disposed on the straight line in a spaced manner, and may recognize a plurality of surfaces based on the calculated cross ratio.

Then, the control device 400 may recognize at least two light emitting devices (E, F) (i.e., third light emitting devices) disposed at a position that is distant from the straight line, and may determine a posture of the HMD 100 (e.g., motion, gradient, rotation, position, and the like) using at least one of the recognized at least two light emitting devices (E, F) and the at least four light emitting devices (A, B, C, D).

For this, the third light emitting devices (E, F) included in each of the plurality of light emitting units may be arranged to satisfy preset conditions. The at least two light emitting devices (E, F) may be arranged such that straight lines connecting two among the at least four light emitting devices (A, B, C, D) disposed on a straight line in a spaced manner, with the at least two light emitting devices (E, F) are not parallel to each other.

For instance, the two third light emitting devices (E, F) may be arranged such that straight lines connecting any two among the first and second light emitting devices (A, B, C, D) disposed on a straight line in a spaced manner, with the two third light emitting devices (E, F) are not parallel to each other.

The any two light emitting devices may be light emitting devices (A, D) arranged at two ends among the at least four light emitting devices (A, B, C, D). Alternatively, the any two light emitting devices may be two first light emitting devices which emit light such that brightness of the light is changed at the preset time intervals, among the at least four light emitting devices (A, B, C, D).

Referring to FIG. 5, the light emitting unit 200a provided on the front surface 103a may be formed such that straight lines formed by any two of at least four light emitting devices (A, B, C, D) disposed on a straight line (l1) in a spaced manner, and formed by at least two light emitting devices (E, F) disposed at a position that is distant from the straight line (l1) are not parallel to each other.

For instance, if the any two light emitting devices are light emitting devices (A, D) disposed at two ends among the at least four light emitting devices (A, B, C, D) (or if A and D are first light emitting devices), the at least two light emitting devices (E, F) disposed at a position that is distant from the straight line (l1) may be arranged such that the straight line (l1) connecting A and D with each other is not parallel to a straight line (l3) connecting E and F with each other, and such that a straight line (l2) connecting A and E with each other is not parallel to a straight line (l4) connecting D and F with each other.

Although not shown in the drawings, even in a case where the any two light emitting devices are light emitting devices B, C, the at least two light emitting devices (E, F) may be arranged at a position that is distant from the straight line (l1), such that straight lines formed by the any two light emitting devices (A,B), (A, C), (B, C), (B, D) or (C, D) and formed by the at least two light emitting devices (E, F) are not parallel to each other.

With such a configuration, the control device 400 may determine a posture of the HMD 100 based on a shape of a diagram (figure) formed by any two among at least four light emitting devices (A, B, C, D) disposed on a straight line in a spaced manner, and formed by at least two light emitting devices (E, F) disposed at a position that is distant from the straight line.

At least two light emitting devices, disposed at a position that is distant from a straight line included in one light emitting unit among a plurality of light emitting units, may be arranged to be closer to at least four light emitting devices spaced from each other on the straight line included in the one light emitting unit 200a, than to light emitting devices included in light emitting units that are different from the one light emitting unit among the plurality of light emitting units.

One of the at least two light emitting devices disposed at a position that is distant from the straight line and included in one light emitting unit may be arranged such that a distance from a light emitting device disposed at one end among the at least four light emitting devices included in the one light emitting unit, is shorter than a distance from a light emitting device disposed at one end among at least four light emitting devices included in another light emitting unit that is different from the one light emitting unit.

A light emitting device disposed at one end among the at least four light emitting devices included in the one light emitting unit may be closer to one of the at least two light emitting devices disposed at a position that is distant from the at least four light emitting devices.

For instance, as shown in FIG. 6, at least two light emitting devices (205a, 206a), disposed at a position that is distant from a straight line included in one light emitting unit (200a) among a plurality of light emitting units (200a, 200b, 200c, 200d, 200e, 200f), may be arranged to be closer to at least four light emitting devices (201a, 202a, 203a, 204a) that are spaced from each other on the straight line included in the one light emitting unit 200a, than to light emitting devices (201b, 202b, 203b, 204b, 201c, 202c, 203c, 204c, 201d, 202d, 203d, 204d) included in light emitting units (e.g., 200b, 200c, 200d) that are different from the one light emitting unit (200a) among the plurality of light emitting units.

Also, one light emitting device (e.g., 205a) among the at least two light emitting devices (205a, 206a) included in the one light emitting unit (200a) may be arranged such that a distance (d1) from the light emitting device (e.g., 201a) disposed at one end among the at least four light emitting devices (201a, 202a, 203a, 204a) included in the one light emitting unit (200a), is shorter than distances (d2, d3, d4, d5) from light emitting devices (201b, 204b, 201c, 201e) arranged at two ends or one end among at least four light emitting devices included in each of other light emitting units (200b, 200c, 200e).

A light emitting device disposed at one end among the at least four light emitting devices (201a, 202a, 203a, 204a) included in the one light emitting unit (200a) may be closer to one of the at least two light emitting devices (205a, 206a) disposed at a position that is distant from the at least four light emitting devices (201a, 202a, 203a, 204a) included in the one light emitting unit (200a). That is, if the one light emitting device is 205a, the light emitting device arranged at the one end may be 201a. On the contrary, if the one light emitting device is 206a, the light emitting device arranged at the one end may be 204a.

That is, a position of at least two light emitting devices disposed at a position that is distant from a straight line included in one light emitting unit among a plurality of light emitting units may be determined based on distances between one of the at least two light emitting devices and light emitting units arranged on surfaces adjacent to the one light emitting device.

For instance, a position of the light emitting device (205a) adjacent to the left side surface 103b, among the at least two light emitting devices (205a, 206a) included in the light emitting unit (200a) provided on the front surface 103a, may be determined based on a distance (d1) from the light emitting device (201a) close to the left side surface 103b, among the two light emitting devices (201a, 204a) disposed at two ends among the at least four light emitting devices (201a, 202a, 203a, 204a) disposed on a straight line in a spaced manner at the light emitting unit (200a) provided on the front surface 103a. Also, the position of the light emitting device (205a) that is adjacent to the left side surface 103b may be determined based on a distance (d2) from the light emitting device (201b) disposed at one end among at least four light emitting devices (201b, 202b, 203b, 204b) disposed on a straight line in a spaced manner at the light emitting unit (200b) provided on the left side surface 103b. Also, the position of the light emitting device (205a) that is adjacent to the left side surface 103b may be determined based on a distance (d3) from the light emitting device (204b) disposed at another end among the at least four light emitting devices (201b, 202b, 203b, 204b). Also, the position of the light emitting device (205a) that is adjacent to the left side surface 103b may be determined based on a distance (d4) from the light emitting device (201c) disposed at one of two ends among at least four light emitting devices (201c, 202c, 203c, 204c) disposed on a straight line in a spaced manner at the light emitting unit (200c) provided on the lower side surface 103c, the one closer to the left side surface 103b. Also, the position of the light emitting device (205a) that is adjacent to the left side surface 103b may be determined based on a distance (d5) from the light emitting device (201e) disposed at one of two ends among at least four light emitting devices (201e, 202e, 203e, 204e) disposed on a straight line in a spaced manner at the light emitting unit (200e) provided on the upper side surface 103e, the one closer to the left side surface 103b.

The light emitting device (205a) that is adjacent to the left side surface 103b among the at least two light emitting devices (205a, 206a) included in the light emitting unit (200a) provided on the front surface 103a may be arranged such that the distance (d1) is shorter than the distances (d2, d3, d4, d5).

As another example, a position of the light emitting device (206a) that is adjacent to the right side surface 103d among the at least two light emitting devices (205a, 206a) included in the light emitting unit (200a) provided on the front surface 103a may be determined based on a distance (r1) from the light emitting device (204a) that is close to the right side surface 103d among the two light emitting devices (201a, 204a) disposed at two ends among the at least four light emitting devices (201a, 202a, 203a, 204a) disposed on a straight line in a spaced manner at the light emitting unit (200a) provided on the front surface 103a. Also, the position of the light emitting device (206a) that is adjacent to the right side surface 103d may be determined based on a distance (r2) from the light emitting device (201d) disposed at one end among at least four light emitting devices (201d, 202d, 203d, 204d) disposed on a straight line in a spaced manner at the light emitting unit (200d) provided on the right side surface 103d. Also, the position of the light emitting device (206a) that is adjacent to the right side surface 103d may be determined based on a distance (r3) from the light emitting device (204d) disposed at another end among the at least four light emitting devices (201d, 202d, 203d, 204d). Also, the position of the light emitting device (206a) that is adjacent to the right side surface 103d may be determined based on a distance (r4) from the light emitting device (204c) disposed at one of two ends among the at least four light emitting devices (201c, 202c, 203c, 204c) disposed on a straight line in a spaced manner at the light emitting unit (200c) provided on the lower side surface 103c, the one that is closer to the right side surface 103d. Also, the position of the light emitting device (206a) that is adjacent to the right side surface 103d may be determined based on a distance (r5) from the light emitting device (204e) disposed at one of two ends among the at least four light emitting devices (201e, 202e, 203e, 204e) disposed on a straight line in a spaced manner at the light emitting unit (200e) provided on the upper side surface 103e, the one closer to the right side surface 103d.

The light emitting device (206a) that is adjacent to the right side surface 103d among the at least two light emitting devices (205a, 206a) included in the light emitting unit (200a) provided on the front surface 103a may be arranged such that the distance (r1) is shorter than the distances (r2, r3, r4, r5).

Referring to FIG. 6, among the at least four light emitting devices (201a, 202a, 203a, 204a) disposed on a straight line in a spaced manner at the light emitting unit (200a) provided on the front surface 103a, the light emitting devices (201a, 204a) disposed at two ends are called 'first light emitting devices' which emit light such that brightness of the light is changed at preset time intervals, and the rest of the light emitting devices (202a, 203a) are called 'second light emitting devices'. And the two light emitting devices (205a, 206a) disposed at a position that is distant from the straight line are called 'third light emitting devices'.

The two third light emitting devices (205a, 206a), included in one light emitting unit (200a) among the plurality of light emitting units (200a, 200b, 200c, 200d, 200e, 200f), may be arranged so as to be closer to one of the first to fourth light emitting devices (201a, 202a, 203a, 204a) included in the one light emitting unit (200a), than to one of first to third light emitting devices (201b~206b, 201c~206c, 201d~206d, 201e~206e and 201f~206f) included in other light emitting units (200b, 200c, 200d, 200e, 200f) that are different from the one light emitting unit (200a) among a plurality of light emitting units.

More specifically, the two third light emitting devices (205a, 206a) included in the one light emitting unit (200a) may be arranged such that the distances (d1, r1) from the first light emitting devices (201a, 204a) included in the one light emitting unit (200a) are shorter than the distances (d2, d3, d4, d5, r2, r3, r4, r5) from the first light emitting devices (201b, 204b, 201c, 204c, 201d, 204d, 201e, 204e) included in said other light emitting units.

For instance, the distance (d1) between one third light emitting device (e.g., 205a) among the two third light emitting devices (205a, 206a) included in the one light emitting unit (200a), and one first light emitting device (201a) that is closer to the one third light emitting device (205a) among the two first light emitting devices (201a, 204a) included in the one light emitting unit (200a), may be shorter than the distances (d2, d3, d4, d5) between the one third light emitting device (205a) and the first light emitting devices (201b, 204b, 201c, 201e) included in said other light emitting units.

In a case where the one third light emitting device is 206a, the distance (r1) between the one third light emitting device (206a) and one first light emitting device (204a) that is closer to the one third light emitting device (206a) among the two first light emitting devices (201a, 204a) included in the one light emitting unit (200a) may be shorter than the distances (r2, r3, r4, r5) between the one third light emitting device (206a) and the first light emitting devices (201d, 204d, 204c, 204e) included in said other light emitting units.

The above configuration is implemented such that the light emitting units provided on the plurality of surfaces are recognized by the control device 400. The context that the light emitting units provided on the plurality of surfaces are recognized may mean that light emitting devices provided on each surface are categorized into a group.

More specifically, the control device 400 may categorize at least four light emitting devices disposed on a straight line in a spaced manner into one group based on an image received via the camera 300. Then, the control device 400 may recognize light emitting devices except for the light emitting devices included in the one group (e.g., at least two light emitting devices disposed at a position that is distant from the straight line) as a single light emitting unit, together with the light emitting devices included in the one group.

The control device 400 may select at least two light emitting devices rather than the light emitting devices included in the one group. The at least two light emitting devices are arranged to be closer to the light emitting devices included in the one group than to light emitting devices included in another group. For instance, assuming that surfaces arranged to face the camera 300 among a plurality of surfaces of the HMD 100 are the front surface 103a and the left side surface 103b, the control device 400 may categorize the at least four light emitting devices (201a, 202a, 203a, 204a) disposed on a straight line in a spaced manner on the front surface 103a into a first group, and categorize the at least four light emitting devices (201b, 202b, 203b, 204b) disposed on a straight line in a spaced manner on the left side surface 103b into a second group based on an image received via the camera 300.

Then, the control device 400 determines whether the light emitting devices (205a, 206a) rather than the light emitting devices included in the first and second groups are closer to the light emitting devices included in the first group, or closer to the light emitting devices included in the second group.

For instance, the control device 400 may recognize a single light emitting unit based on the distances (d1, d2, d3). The distance (d1) indicates a distance between the light emitting device (205a) that is closer to the left side surface 103b among the light emitting devices (205a, 206a), and the light emitting device (201a) that is closer to the left side surface 103b among the first light emitting devices (which are disposed at two ends) (201a, 204a) of the at least four light emitting devices included in the first group. The distance (d2) indicates a distance between the light emitting device (205a) that is closer to the left side surface 103b among the light emitting devices (205a, 206a), and the light emitting device (201b), one of the first light emitting devices (which are disposed at two ends) (201b, 204b) among the at least four light emitting devices included in the second group. The distance (d3) indicates a distance between the light emitting device (205a) that is closer to the left side surface 103b among the light emitting devices (205a, 206a), and the light emitting device (204b), another of the first light emitting devices (which are disposed at two ends) (201b, 204b) among the at least four light emitting devices included in the second group. If the distance (d1) is shorter than the distances (d2, d3), the control device 400 may determine that the light emitting device (205a) that is disposed closer to the left side surface 103b forms a single light emitting unit, together with the first group that is disposed on the front surface 103a, not with the second group that is disposed on the left side surface 103b.

According to an embodiment of the present invention, the light emitting devices of the HMD 100 may be arranged such that at least one of the conditions aforementioned with reference to FIGS. 5 and 6 is satisfied. More specifically, the light emitting devices may include at least four light emitting devices disposed on a straight line in a spaced manner, and at least two light emitting devices disposed on a position that is distant from the straight line. The at least two light emitting devices may be arranged such that straight lines formed by any two among the at least four light emitting devices, and formed by the at least two light emitting devices are not parallel to each other, and such that distances from the at least four light emitting devices are shorter than distances from light emitting devices included in another light emitting unit.

Further, the light emitting devices of the HMD 100 may be arranged such that a distance separating two adjacent light emitting devices is more than a preset value. More specifically, the at least four light emitting devices and the at least two light emitting devices (the first to third light emitting devices) may be arranged to have more than a preset value of distance therebetween. The preset value is determined by a user, and may be 20 mm, for example.

A distance between two light emitting devices that are closest to each other among light emitting devices included in one light emitting unit and another light emitting unit may be more than a preset value. The distance may be either a shortest distance between the two light emitting devices that passes through the body, or a shortest distance between the two light emitting devices on a surface of the body.

The controller 180 of the HMD 100 may cause light emitting devices provided on a plurality of surfaces of the body to have different light emitting patterns. The light emitting patterns may be formed such that the control device 400 determines a posture of the HMD 100 in an asynchronous manner. That is, the controller 180 may cause at least part of the light emitting devices provided on the plurality of surfaces to emit light differently from the rest of the light emitting devices.

The controller 180 of the HMD 100 may cause two of at least four light emitting devices disposed on a straight line in a spaced manner on each of a plurality of light emitting units to emit light differently from the rest of the light emitting devices. The two light emitting devices may be light emitting devices arranged at two ends among the at least four light emitting devices.

For instance, as shown in FIG. 6, the controller 180 may cause two of at least four light emitting devices (201a, 202a, 203a, 204a) disposed on a straight line in a spaced manner on the light emitting unit (200a) provided on the front surface 103a to emit light differently from the rest of the light emitting devices.

The two light emitting devices may be light emitting devices (201a, 204a) arranged at two ends among the at least four light emitting devices (201a, 202a, 203a, 204a). However, the present invention is not limited to this. That is, the two light emitting devices may be any two light emitting devices among the at least four light emitting devices (201a, 202a, 203a, 204a).

The controller 180 may cause the two light emitting devices (201a, 204a) to emit light of different brightness at preset time intervals. More specifically, the brightness of light emitted from the two light emitting devices (201a, 204a) may be changed at preset time intervals. The context that the brightness of light emitted from the light emitting devices may be changed at preset time intervals may mean that the light emitting devices flicker on and off. The light emitting devices flicker on and off such that the control device 400 recognizes at least four light emitting devices disposed on a straight line in a spaced manner at the body of the HMD 100.

That is, without an additional synchronization process, the control device 400 may recognize two light emitting devices which emit light such that brightness of the light is changed at preset time intervals, and may recognize the rest of the light emitting devices disposed on the same straight line as the two light emitting devices. Then, the control device 400 may calculate a cross ratio of the at least four light emitting devices disposed on the straight line in a spaced manner, thereby recognizing a surface where the at least four light emitting devices are disposed on the straight line in a spaced manner, among a plurality of surfaces of the HMD 100. Thus, the control device 400 may recognize a plurality of surfaces of the HMD 100 without synchronizing an open close time of a shutter of the camera 300 with a time when brightness of light emitted from the two light emitting devices is changed (i.e., in an asynchronous manner).

However, the present invention is not limited to this. That is, the control device 400 may synchronize an open close time of the shutter of the camera 300, with a time when brightness of light emitted from the two light emitting devices is changed, in order to prevent occurrence of blur due to the light emitted from the two light emitting devices.

The light emitted from the two light emitting devices may be controlled such that its brightness is changed at more than a predetermined brightness. More specifically, the controller 180 may control the two light emitting devices (201a, 204a) such that brightness of light emitted from the two light emitting devices (201a, 204a) is changed at preset time intervals at more than a preset brightness.

When the preset brightness is 50% of a maximum brightness of the light emitting devices, the two light emitting devices (201a, 204a) are not turned on/off at preset time intervals. Rather, the two light emitting devices (201a, 204a) may emit light such that brightness of the light is changed at the preset time intervals, at more than a preset brightness (50%) (e.g., 50%→100%→50%→100% . . . ). The reason why the controller 180 controls the two light emitting devices 201a, 204a to emit light such that brightness of the light is changed at the preset time intervals at more than a preset brightness, is in order for the control device 400 to continuously trace the two light emitting units 201a, 204a.

The controller 180 may control the remaining light emitting devices (202a, 203a) except for the two light emitting devices (201a, 204a) among the at least four light emitting devices (201a, 202a, 203a, 204a) to emit light of a constant brightness.

Further, the controller 180 may cause light emitting devices (205a, 206a) disposed at a position that is distant from the at least four light emitting devices (201a, 202a, 203a, 204a) in the light emitting unit 200a to emit light of a constant brightness. The light emitting devices (205a, 206a) and the rest of the light emitting devices (202a, 203a) may emit light of the same brightness or different brightness.

Among the light emitting devices included in the light emitting unit, the light emitting devices (201a, 204a) may be called 'blink light emitting devices' since they emit light such that brightness of the light is changed at preset time intervals. And the rest of the light emitting devices (202a, 203a, 205a, 206a) may be called 'static light emitting devices'.

The aforementioned explanations about the light emitting unit (200a) provided on the front surface 103a among a plurality of surfaces may be applicable to explanations about light emitting units (200b, 200c, 200d, 200e, 200f) provided on the plurality of surfaces except for the front surface 103a, in the same manner or in a similar manner.

Hereinafter, a method of determining a posture of the HMD 100 according to the present invention will be explained in more detail with reference to the attached drawings. Hereinafter, it is assumed that the control device 400 determines a posture of the HMD 100. However, the present invention is not limited to this. That is, the HMD 100 may determine its posture by receiving an image from the camera 300.

Figure 7A:
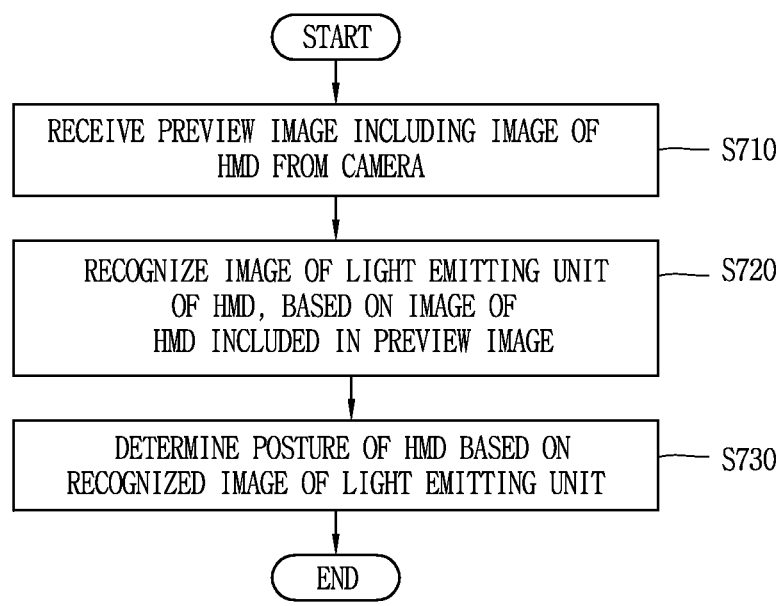
FIGS. 7A and 7B are flowcharts illustrating a method of determining a posture of an HMD according to an embodiment of the present invention.
Figure 7B:
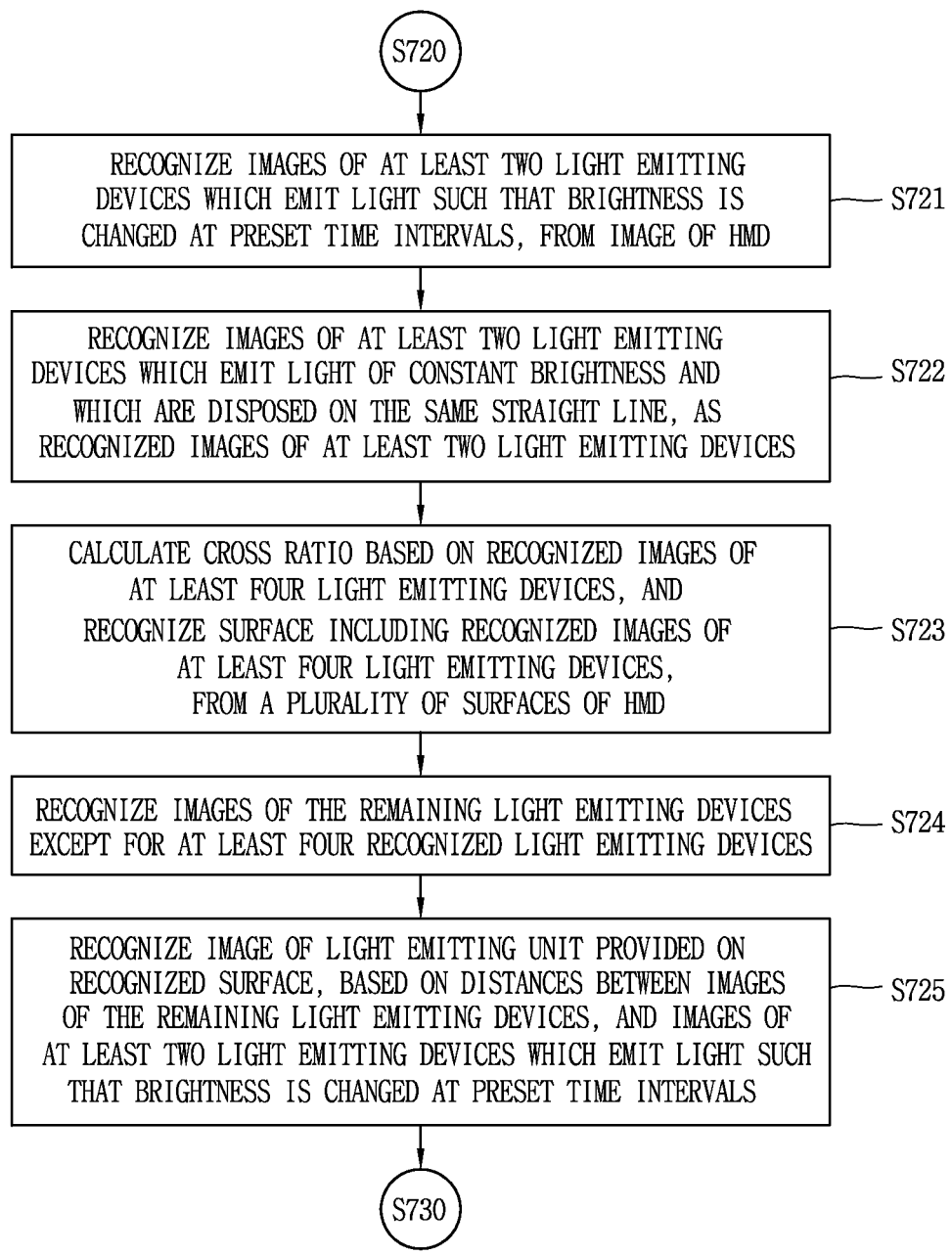
Figure 8:
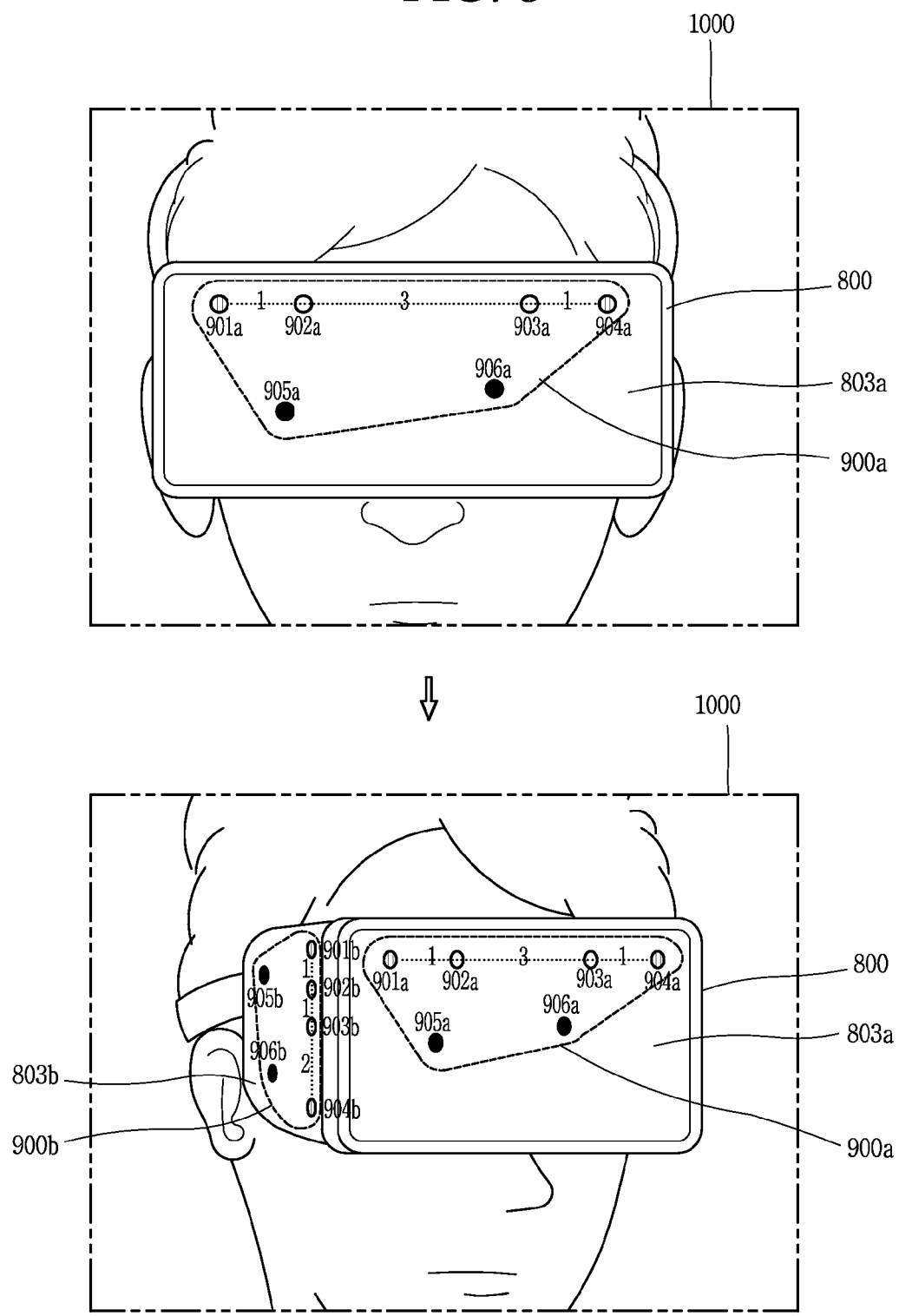
FIG. 8 is a conceptual view illustrating the method of FIG. 7B according to an embodiment of the present invention.

FIGS. 7A and 7B are flowcharts illustrating a method of determining a posture of an HMD according to the present invention, and FIG. 8 is a conceptual view illustrating the method of FIG. 7B.

Referring to FIG. 7A, the control device 400 receives a preview image including an image of the HMD 100 from the camera 300 (S710). The preview image received from the camera 300 disposed to face the HMD 100 may include an image 800 of the HMD 100.

The control device 400 may compensate for distortion of the preview image occurring due to a wide angle lens of the camera 300. A method of compensating for the distortion of the preview image will be omitted because it is not within the scope of the present invention.

Then, the control device 400 recognizes images of a plurality of light emitting units formed on a plurality of surfaces of the HMD 100 based on the image of the HMD included in the preview image (S720). More specifically, the control device 400 may recognize images of light emitting devices from images included in the preview image, and may recognize images of light emitting units based on a position of the recognized images of the light emitting devices.

Then, the control device 400 determines a posture of the HMD 100 based on the recognized images of the light emitting devices (S730). More specifically, the control device 400 may determine a mounted state of the HMD 100, a tilted degree of the HMD, a position of the HMD, and the like based on the recognized image of the light emitting unit. Further, the control device 400 may determine movement or rotation of the HMD 100 by tracing the recognized images of the light emitting units.

Hereinafter, a method (S720) of recognizing a plurality of light emitting units of the HMD will be explained in more detail with reference to FIG. 7B.

Referring to FIG. 7B, the control device 400 recognizes images of at least two light emitting devices that emit light such that brightness is changed at preset time intervals, from the image 800 of the HMD 100 (S721).

For instance, as shown in an upper drawing of FIG. 8, the control device 400 receives a preview image 1000 from the camera 300. Then, the control device 400 recognizes images (901a, 904a) of at least two light emitting devices, which emit light such that brightness is changed at preset time intervals, from images included in the preview image 1000.

The at least two light emitting devices, which emit light such that brightness is changed at preset time intervals, may be the light emitting devices (201a, 204a) arranged at two ends among the at least four light emitting devices (201a, 202a, 203a, 204a), as explained with reference to FIG. 6.

Then, the control device 400 recognizes images (902a, 903a) of at least two light emitting devices which emit light of a constant brightness, the images (902a, 903a) disposed on the same straight line as the images (901a, 904a) of the at least two light emitting devices (S722).

The at least two light emitting devices which emit light of a constant brightness may be the rest of the light emitting devices (202a, 203a) except for the light emitting devices (201a, 204a) which emit light such that brightness is changed at preset time intervals, among the at least four light emitting devices (201a, 202a, 203a, 204a) disposed on a straight line in a spaced manner, as explained with reference to FIG. 6.

The control device 400 may categorize the recognized images (901a, 902a, 903a, 904a) as a single group. Then, the control device 400 may calculate a cross ratio based on a ratio of distances among the recognized images (901a, 902a, 903a, 904a) of the at least four light emitting devices, and may recognize a surface where the recognized at least four light emitting devices are formed, among a plurality of surfaces of the HMD 100 (S723).

For instance, as shown in the upper drawing of FIG. 8, if a cross ratio calculated based on a ratio of distances among the recognized images (901a, 902a, 903a, 904a) of the at least four light emitting devices is the same as a cross ratio of at least four light emitting devices disposed on a straight line in a spaced manner on the front surface 103a of the HMD 100, the control device 400 may determine that a surface, which faces the camera 300 among a plurality of surfaces of the HMD, is the front surface 103a.

That is, the control device 400 may determine that an image (803a) of a surface including the recognized images (901a, 902a, 903a, 904a) is an image (803a) of the front surface among the plurality of surfaces of the HMD 100 among images of the plurality of surfaces of the HMD 100 included in the preview image 1000.

Then, the control device 400 recognizes images (905a, 906a) of the remaining light emitting devices except for the recognized at least four light emitting devices (S724).

More specifically, the control device 400 may recognize images (905a, 906a) of the rest of the light emitting devices, except for the images (902a, 903a) of the light emitting devices disposed on the same straight line as the images (901a, 904a) of the at least two light emitting devices which emit light such that brightness of the light is changed at preset time intervals.

Then, the control device 400 may recognize an image (900a) of a light emitting unit included in the recognized surface based on distances between the images (905a, 906a) of the rest of the light emitting devices and the images (901a, 904a) of the at least two light emitting devices which emit light such that brightness of the light is changed at preset time intervals.

For instance, as shown in the upper drawing of FIG. 8, if the preview image 1000 includes only the two images (901a, 904a) of the at least two light emitting devices which emit light such that brightness of the light is changed at preset time intervals, the control device 400 may determine that the images (905a, 906a) of the rest of the light emitting devices and the images (901a, 904a) of the at least two light emitting devices correspond to the image (900a) of the single light emitting unit. That is, the control device 400 may determine that the images (901a, 904a) of the at least two light emitting devices, the images (902a, 903a) disposed on the same straight line as the images (901a, 904a), and the images (905a, 906a) of the rest of the light emitting devices are included in the image (900a) of the single light emitting device.

The context that the images (901a, 902a, 903a, 904a, 905a, 906a) are included in the image (900a) of the single light emitting device may mean that light emitting devices corresponding to the recognized images (901a, 902a, 903a, 904a, 905a, 906a) are arranged on one of a plurality of surfaces of the HMD 100.

As another example, as shown in a lower drawing of FIG. 8, if the preview image 1000 includes at least four images (901a, 904a, 901b, 904b) of light emitting devices which emit light such that brightness of the light is changed at preset time intervals, the control device 400 may determine whether the images (905a, 906a) of the rest of the light emitting devices form an image of a single light emitting unit, together with one of the at least four images (901a, 904a, 901b, 904b), based on distances between the images (905a, 906a) and the at least four images (901a, 904a, 901b, 904b).

That is, the control device 400 recognizes one (905a) of the images (905a, 906a) of the remaining light emitting devices, and one (901a) that is positioned closest to the image (905a) among the at least four images (901a, 904a, 901b, 904b) of light emitting devices which emit light such that brightness of the light is changed at preset time intervals. Then, the control device 400 may determine that the images (902a, 903a, 904a) (first group) disposed on the same straight line as the image (901a) that is closest to the image (905a) are included in the image (900a) of a single light emitting unit.

The context of recognizing the image of a single light emitting unit may mean recognizing a surface where the remaining light emitting devices are disposed among a plurality of surfaces of the HMD 100. By the above described processes, the control device 400 may recognize a plurality of light emitting units provided on a plurality of surfaces of the HMD 100.

Then, the control device 400 may determine a posture of the HMD 100 based on the recognized image of the light emitting unit. More specifically, information about light emitting devices arranged on the HMD 100 may be stored in a memory of the control device 400.

The information may include a cross ratio of at least four light emitting devices disposed on a straight line in a spaced manner on each of a plurality of surfaces, separation distances among light emitting devices included in each of a plurality of light emitting units, diagram information (figure information) about a diagram formed by light emitting devices (e.g., a shape of a diagram formed by light emitting devices which emit light such that brightness of the light is changed at preset time intervals, and formed by the remaining light emitting devices), and the like.

Then, the control device 400 may determine a posture of the HMD 100 based on the stored information, and based on the recognized image of the light emitting unit.

For instance, as shown in the upper drawing of FIG. 8, the control device 400 may determine a mounted position of the HMD 100, a tilted degree of the HMD 100, and the like based on the images (901a, 904a, 905a, 906a) included in the recognized image (900a) of the light emitting unit. The images (901a, 904a) indicate images of the light emitting devices which emit light such that brightness of the light is changed at preset time intervals, and the images (905a, 906a) indicate images of the rest of the light emitting devices.

Then, as shown in the lower drawing of FIG. 8, if a posture of the HMD 100 is changed when a wearer of the HMD 100 moves, the control device 400 may determine a movement degree or a rotation degree of the HMD 100 based on the images (901a, 904a, 905a, 906a) included in the recognized image (900a) of the light emitting unit.

As shown in the lower drawing of FIG. 8, if images of new light emitting devices are detected, the control device 400 may recognize a surface (803b) including the images of the new light emitting devices, through the steps (S721~S723). Further, the control device 400 may recognize an image (900b) of a new light emitting unit based on the images of the new light emitting devices, through the steps (S724~S725). Then, the control device 400 may determine a posture of the HMD 100 based on the image (900b) of the new light emitting unit.

As aforementioned, the present invention can have the following advantages.

Firstly, the HMD is provided with at least four light emitting devices disposed on a straight line in a spaced manner, on each of a plurality of surfaces, for a different cross ratio. Thus, the HMD can determine its posture based on the cross ratio.

Secondly, among at least four light emitting devices disposed on a straight line in a spaced manner, two light emitting devices are formed to have a different light emitting method from the rest of the light emitting devices. Thus, the at least four light emitting devices disposed on a straight line and having a cross ratio can be recognized more easily.

Thirdly, the two light emitting devices, formed to have a different light emitting method from the remaining light emitting devices, are configured to emit light such that brightness of the light is changed at preset time intervals at more than a preset brightness. Thus, the two light emitting devices can be traced (recognized or identified) easily.

Fourthly, at least two light emitting devices are arranged at a position that is distant from the straight line for determination of a posture of the HMD. Thus, a posture of the HMD can be determined more precisely based on the at least two light emitting devices, and based on at least four light emitting devices disposed on the straight line.

Fifthly, the at least two light emitting devices disposed on one surface are arranged to be closer to at least four light emitting devices disposed on a straight line on the one surface, than to light emitting devices disposed on other surfaces. Thus, the light emitting devices disposed on the one surface can be recognized more easily.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A head mounted display, comprising:
a body having a plurality of surfaces; and
a plurality of light emitting units, each of the plurality of light emitting units formed on a corresponding one of the plurality of surfaces and configured to emit light to outside of the body,
wherein each of the plurality of light emitting units includes at least four light emitting devices that are disposed in a straight line in a spaced manner such that a specific cross ratio defines spacing for each of the plurality of light emitting units, a cross ratio of one of the plurality of light emitting units being different from cross ratios of other light emitting units among the plurality of light emitting units wherein the cross ratio of the one of the plurality of light emitting units, including four light emitting devices positioned at four points A, B, C, and D, respectively, that are disposed on a same straight line, is represented by the following formula:

$$(A, B; C, D) = \frac{d_{AC} * d_{BD}}{d_{BC} * d_{AD}},$$

wherein $d_{AC}$ indicates a separation distance between A and C, $d_{BD}$ indicates a separation distance between B and D, $d_{BC}$ indicates a separation distance between B and C, and $d_{AD}$ indicates a separation distance between A and D,
wherein each of the cross ratios of the plurality of light emitting units is a projective constant, and
wherein one of the plurality of surfaces, which is directed to face an external camera that is provided outside the head mounted display, is captured by the external camera and recognized based on a corresponding one of the different cross ratios of the plurality of light emitting units.

2. The head mounted display of claim 1, wherein:
the specific cross ratio is determined based on a ratio of distances separating two adjacently located light emitting devices among the at least four light emitting devices; and
each of the plurality of light emitting units is formed to have a different ratio of distances.

3. The head mounted display of claim 1, wherein a mechanism of emitting light by two of the at least four light emitting devices is different from a mechanism of emitting light by the rest of the at least four light emitting devices.

4. The head mounted display of claim 1, wherein at least two of the plurality of surfaces face toward different directions.

5. The head mounted display of claim 1, wherein each of the plurality of surfaces is associated with a specific cross ratio that is different from cross ratios associated with other surfaces among the plurality of surfaces.

6. The head mounted display of claim 2, wherein a first ratio of distances separating two adjacently located light emitting devices among the at least four light emitting devices included in a first one of the plurality of light emitting units is different from a second ratio of distances separating two adjacently located light emitting devices among at least four light emitting devices included in a second one of the plurality of light emitting units.

7. The head mounted display of claim 3, wherein:
the two light emitting devices are first light emitting devices that emit light of which brightness is changed at preset time intervals; and
the rest of the at least four light emitting devices are second light emitting devices that emit light of a constant brightness.

8. The head mounted display of claim 7, wherein one of the first light emitting devices is arranged at one end and the other one of the first light emitting devices is arranged at another end such that the second light emitting devices are arranged between the first light emitting devices.

9. The head mounted display of claim 7, wherein the brightness of the light that is emitted from the first light emitting devices is changed to be greater than a preset brightness.

10. The head mounted display of claim 7, wherein:
each of the plurality of light emitting units further includes third light emitting devices in addition to the first light emitting devices and the second light emitting devices; and
the third light emitting devices comprise two light emitting devices that are disposed at a position that is distant from the straight line and is configured to emit light of a constant brightness.

11. The head mounted display of claim 10, wherein the third light emitting devices are arranged such that a straight line formed by any two among the first and second light emitting devices and a straight line formed by the third light emitting devices are not parallel to each other.

12. The head mounted display of claim 10, wherein:
the first to third light emitting devices are arranged such that each of distances that separate any two of the first to third light emitting devices has a value that is greater than a preset value; and
the preset value is determined by a user.

13. The head mounted display of claim 10, wherein the third light emitting devices included in one of the plurality of light emitting units are arranged to be located closer to any one among the first and second light emitting devices included in the one of the plurality of light emitting units than to any one among first to third light emitting devices included in a different one of the plurality of light emitting units.

14. The head mounted display of claim 11, wherein the any two among the first and second light emitting devices are the first light emitting devices.

15. The head mounted display of claim 13, wherein the third light emitting devices included in the one of the plurality of light emitting units are arranged such that a distance from any one of the first light emitting devices included in the one of the plurality of light emitting units to any one of the third light emitting devices is shorter than a distance from the first light emitting device included in the different one of the plurality of light emitting units to any one of the third light emitting devices.

16. The head mounted display of claim 15, wherein a distance between one of the third light emitting devices included in the one of the plurality of light emitting units and one of the first light emitting devices included in the one of the plurality of light emitting units that is located closer to the one of the third light emitting devices is shorter than distances between the third light emitting device and the first light emitting device that are included in the different one of the plurality of light emitting units.

17. The head mounted display of claim 12, wherein the preset value is 20 mm.

18. A head mounted display system, comprising:
a body having a plurality of surfaces;
a plurality of light emitting units, each of the plurality of light emitting units formed on a corresponding one of the plurality of surfaces and configured to emit light to outside of the body;
an external camera that is provided outside the body and configured to capture the body; and
a control device configured to determine a posture of the body based on an image received via the external camera,
wherein each of the plurality of light emitting units includes at least four light emitting devices that are disposed in a straight line in a spaced manner such that a specific cross ratio defines spacing for each of the plurality of light emitting units, a cross ratio of one of the plurality of light emitting units being different from cross ratios of other light emitting units among the plurality of light emitting units wherein the cross ratio of the one of the plurality of light emitting units, including four light emitting devices positioned at four points A, B, C, and D, respectively, that are disposed on a same straight line, is represented by the following formula:

$$(A, B; C, D) = \frac{d_{AC} * d_{BD}}{d_{BC} * d_{AD}},$$

wherein $d_{AC}$ indicates a separation distance between A and C, $d_{BD}$ indicates a separation distance between B and D, $d_{BC}$ indicates a separation distance between B and C, and $d_{AD}$ indicates a separation distance between A and D,
wherein each of the cross ratios of the plurality of light emitting units is a projective constant, and
wherein at least one of the plurality of surfaces, which is directed to face the external camera, is captured by the external camera and recognized based on a corresponding one of the different cross ratios of the plurality of light emitting units.

19. The head mounted display system of claim 18, wherein the control device is further configured to sense light emitted from at least one of the light emitting units via the external camera.

20. The head mounted display system of claim 19, wherein the control device is further configured to recognize the at least one of the plurality of surfaces that is captured by the external camera.

* * * * *